US008229397B2

(12) United States Patent
Hou et al.

(10) Patent No.: US 8,229,397 B2
(45) Date of Patent: Jul. 24, 2012

(54) ACCESS TERMINAL AUTHORIZATION AT PRIVATE ACCESS POINTS IN WIRELESS NETWORKS

(75) Inventors: Jindong Hou, Waterbeach (GB); Kenneth Jones, Atkinson, NH (US)

(73) Assignee: Airvana, Corp., Chelmsford, MA (US)

( * ) Notice: Subject to any disclaimer, the term of this patent is extended or adjusted under 35 U.S.C. 154(b) by 912 days.

(21) Appl. No.: 12/236,420

(22) Filed: Sep. 23, 2008

(65) Prior Publication Data

US 2010/0075658 A1 Mar. 25, 2010

(51) Int. Cl.
*H04M 1/66* (2006.01)
(52) U.S. Cl. ..... 455/410; 455/411; 455/434; 455/432.3; 455/436; 370/310; 370/328; 370/338
(58) Field of Classification Search ............... 455/410, 455/411, 434, 432.3, 436; 370/310, 328, 370/338
See application file for complete search history.

(56) References Cited

U.S. PATENT DOCUMENTS

| | | | |
|---|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,558,356 B2 | 7/2009 | Pollman et al. |
| 7,558,588 B2 | 7/2009 | To et al. |
| 2002/0196749 A1 | 12/2002 | Eyuboglu et al. |
| 2003/0040313 A1 | 2/2003 | Hogan et al. |
| 2003/0100311 A1 | 5/2003 | Chung et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0037577 A1 | 2/2007 | Dalsgaard et al. |
| 2007/0058628 A1 | 3/2007 | Rao et al. |
| 2007/0077948 A1 | 4/2007 | Sharma et al. |

(Continued)

FOREIGN PATENT DOCUMENTS

GB 2452688 3/2009

(Continued)

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Kamran Afshar
*Assistant Examiner* — Sayed T Zewari
(74) *Attorney, Agent, or Firm* — Fish & Richardson P.C.

(57) ABSTRACT

This description relates to access terminal authorization methods in wireless networks.

55 Claims, 15 Drawing Sheets

U.S. PATENT DOCUMENTS

| | | | |
|---|---|---|---|
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0081636 A1 | 4/2008 | Nylander et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0220741 A1* | 9/2008 | Hung ................... 455/411 |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2010/0075658 A1 | 3/2010 | Hou et al. |

FOREIGN PATENT DOCUMENTS

| | | |
|---|---|---|
| WO | WO2010/039504 | 7/2010 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

International Preliminary Report on Patentability from corresponding PCT application No. PCT/US2009/057904 mailed Apr. 7, 2011 (7 pages).

European Telecommunications Standards Institute 2007, "Digital Cellular Telecommunications System (Phase 2+); Universal Mobile Telecommunications System (UMTS); Non-Access-Stratum (NAS) functions related to Mobile Station (MS) in Idle Mode (3GPP TS 23.122 version 7.9.0 Release 7)", Global System for Mobile Communications, ETSI TS 123 122 version 7.9.0 (Jun. 2007), 37 pages.

European Telecommunications Standards Institute 2007, "Digital Cellular Telecommunications System (Phase 2+); Universal Mobile Telecommunications System (UMTS); Mobile Radio Interface Layer 3 Specification; Core Network Protocols; Stage 3 (3GPP TS 24.008 version 7.9.0 Release 7)", Global System for Mobile Communications, ETSI TS 124 008 version 7.9.0 (Oct. 2007), 549 pages.

European Telecommunications Standards Institute 2008, "Universal Mobile Telecommunications System (UMTS); Requirements for Support of Radio Resource Management (FDD) (3GPP TS 25.133 version 8.3.0 Release 8)", ETSI TS 125 133 version 8.3.0 (Jun. 2008), 191 pages.

European Telecommunications Standards Institute 2008, "Universal Mobile Telecommunications System (UMTS); User Equipment (UE) Procedures in Idle Mode and Procedures for Cell Reselection in Connected Mode (3GPP TS 25.304 version 7.6.0 Release 7)", ETSI TS 25 304 version 7.6.0 (Jul. 2008), 43 pages.

European Telecommunications Standards Institute 2008, "Universal Mobile Telecommunications System (UMTS); Radio Resource Control (RRC); Protocol Specification (3GPP TS 25.331 version 8.3.0 Release 8)", ETSI TS 25 331 version 8.3.0 (Jul. 2008), 1495 pages.

International Search Report and Written Opinion for PCT/US2009/057904, mailed Jun. 4, 2010 (20 pages).

T-Mobile, "Introduction of Home Basestation Identifier on BCCH", 3GPP Draft; R2-083192__Introduction of Home Base Station Identifier on BCCH, 3rd Generation Partnership Project (3GPP), Mobile Competence Centre; 650, Route Des Lucioles; F-06921 Sophia-Antipolis Cedex; France, vol. RAN WG2, no. Warsaw, Poland; 20080623, Jun. 23, 2008, XP050140621, 3 pages.

* cited by examiner

ACCESS TERMINAL AUTHORIZATION AT PRIVATE ACCESS POINTS IN WIRELESS NETWORKS

FIELD

This description relates to access terminal authorization at private access points in wireless networks.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In general, in some aspects, a method includes broadcasting a first access point identifier from a private access point in a radio access network. The method also includes broadcasting a second access point identifier from the private access point. The method also includes receiving a first message from a first access terminal that is authorized on the private access point. The first message includes the second access point identifier. The method also includes sending a second message to the first access terminal. The second message includes the first access point identifier. The second message is configured to cause the first access terminal to remove the first access point identifier from an access point identifier block list of the first access terminal if the first access point identifier is on the access point identifier block list of the first access terminal.

Implementations may include one or more of the following features.

In the method, the first access point identifier may include a first location area identifier. The second access point identifier may include a second location area identifier. The access point identifier block list may include a forbidden list.

In the method, when the first access terminal sends the first message to the private access point, the first access point identifier may be on the access point identifier block list of the first access terminal.

In the method, the private access point may be configured so that the second access point identifier is never sent in any message from the private access point that would cause the second access point identifier to be placed on an access point identifier block list of any access terminal that is authorized on the private access point.

In the method, the private access point may be configured so that the second access point identifier is never sent in any reject message originating from the private access point.

The method may also include determining whether the first access terminal is authorized or unauthorized on the private access point. Determining whether the first access terminal is authorized or unauthorized on the private access point may include comparing an access terminal identifier of the first access terminal to an access control list. The access control list may be stored on the private access point.

The method may also include stopping broadcasting the second access point identifier when every access terminal that is authorized on the private access point is using the private access point.

In the method, broadcasting the second access point identifier from the private access point may include broadcasting the second access point identifier at least one of periodically or randomly. The method may also include listening to information broadcast from a macrocell access point, and determining an interval within which to broadcast the second access point identifier using a portion of the information. In the method, the portion of the information may include discontinuous receive cycle length parameters. The method may also include listening to information broadcast from a macrocell access point, and determining an interval within which to broadcast the second access point identifier using a portion of the information.

In the method, when the second access point identifier is being broadcast from the private access point, the first access point identifier may not be being broadcast from the private access point.

In the method, broadcasting the first access point identifier from the private access point may include broadcasting the first access point identifier in a first pilot signal from the private access point, and, for at least some of a time that the first access point identifier is broadcast, broadcasting the first access point identifier concurrently with broadcasting the second access point identifier. In the method, broadcasting the second access point identifier from the private access point may include broadcasting the second access point identifier in a second pilot signal from the private access point. In the method, the first pilot signal may have a corresponding first scrambling code and the second pilot signal may have a corresponding second scrambling code. The first scrambling code may be different from the second scrambling code. The method may also include broadcasting a first neighbor list. The first neighbor list may include a third scrambling code. The third scrambling code may correspond to a macrocell access point. The method may also include broadcasting a second neighbor list. The second neighbor list may include the first scrambling code. In the method, broadcasting the second access point identifier in the second pilot signal may include broadcasting the second access point identifier in a greeting pilot signal from the private access point. The method may also include stopping broadcasting the greeting pilot signal when every access terminal that is authorized on the private access point is using the private access point. In the method, broadcasting the second access point identifier in the second pilot signal from the private access point may include broadcasting the greeting pilot signal at least one of periodically or randomly.

In the method, broadcasting the first access point identifier from the private access point may include broadcasting the first access point identifier in a first pilot signal from the private access point, and, for at least some of a time that the first access point identifier is broadcast, broadcasting the first access point identifier concurrently with broadcasting the second access point identifier. In the method, broadcasting the second access point identifier from the private access point may include broadcasting the second access point identifier in a second pilot signal from the private access point. The method may also include receiving a third message from the first access terminal. The third message may include the second access point identifier. The method may also include sending a reject message to the first access terminal. The method may also include receiving a fourth message from the first access terminal in response to the first pilot signal. The fourth message may include the first access point identifier. The method may also include sending a fifth message to the first access terminal. The fifth message may include the first access point identifier. The method may also include registering the first access terminal with the one or more entities in the radio access network for communications between the one or more entities and the first access terminal via the private access point using the first access point identifier.

The method may also include receiving a third message from the first access terminal. The third message may include the second access point identifier. The method may also include sending a fourth message to the first access terminal. The fourth message may include the second access point identifier. The method may also include translating the second access point identifier to the first access point identifier to facilitate communication between one or more other entities in the radio access network and the first access terminal via the private access point, and so that the second access point identifier is not used in communication between the private access point and the one or more entities. The method may also include registering the first access terminal with the one or more entities.

In the method, sending the second message may include sending a location area update accept message to the first access terminal. The location area update accept message may include the first access point identifier. The first access point identifier may include a first location area identifier. In the method, receiving the first message may include receiving a location area update request message from the first access terminal. The location area update request message may include the second access point identifier. The second access point identifier may include a second location area identifier. The method may also include receiving a second location area update request message from the first access terminal. The second location area update request message may include the second access point identifier. The second access point identifier may include the second location area identifier. The method may also include sending a second location area update accept message to the first access terminal. The second location area update accept message may include the second access point identifier. The second access point identifier may include the second location area identifier.

In the method, sending the second message may include sending a location area update accept message to the first access terminal. The location area update accept message may include the first access point identifier. The first access point identifier may include a first location area identifier. In the method, receiving the first message may include receiving a location area update request message from the first access terminal. The location area update request message may include the second access point identifier. The second access point identifier may include a second location area identifier. In the method, broadcasting the first access point identifier from the private access point may include broadcasting the first access point identifier in a first pilot signal from the private access point, and, for at least some of a time that the first access point identifier is broadcast, broadcasting the first access point identifier concurrently with broadcasting the second access point identifier. In the method, broadcasting the second access point identifier from the private access point may include broadcasting the second access point identifier in a second pilot signal from the private access point. The method may also include receiving a second location area update request message from the first access terminal. The second location area update request message may include the second access point identifier. The second access point identifier may include the second location area identifier. The method may also include sending a location area update reject message to the first access terminal. The method may also include receiving a third location area update request message from the first access terminal in response to the first pilot signal. The third location area update request message may include the first access point identifier. The first access point identifier may include the first location area identifier. The method may also include sending a second location area update accept message to the first access terminal. The second location area update accept message may include the first access point identifier.

In some aspects, a method includes broadcasting a first access point identifier from a private access point in a radio access network. The method also includes broadcasting a second access point identifier from the private access point. The first access point identifier and the second access point identifier are configured to identify the private access point to access terminals in the radio access network. The second access point identifier is different from the first access point identifier. Individual ones of the access terminals are either authorized or unauthorized on the private access point.

Implementations may include one or more of the following features.

In the method, the first access point identifier may include a first location area identifier and the second access point identifier may include a second location area identifier.

The method may also include determining whether an access terminal of the access terminals is authorized or unauthorized on the private access point by comparing an access terminal identifier of the access terminal to an access control list. The access control list may be stored on the private access point. The access terminal identifier may include an International Mobile Subscriber Identity (IMSI).

The method may also include, prior to broadcasting the second access point identifier from the private access point, receiving a first message from a first access terminal of the access terminals. The first message may include the first access point identifier. The method may also include, prior to broadcasting the second access point identifier from the private access point, determining that the first access terminal is unauthorized on the private access point. The method may also include, prior to broadcasting the second access point identifier from the private access point, determining that the first access point identifier is the same as an access point identifier of an other private access point on which the first access terminal is authorized. In the method, the access point identifier of the other private access point may include a location area identifier. In the method, receiving the first message may include receiving a location area update request message from the first access terminal. The location area update request message may include the first access point identifier. The first access point identifier may include a first location area identifier. In the method, determining that the first access point identifier is the same as the access point identifier of the other private access point may include at least one of accessing a database, or receiving an indication that the first access point identifier is the same as the access point identifier of the other private access point. The method may also include, prior to broadcasting the second access point identifier, determining that the second access point identifier is not on an access point identifier block list of a second access terminal of the access terminals, the second access terminal being authorized on the private access point. In the method, the access point identifier block list may include a forbidden list. In the method, determining that the second access point identifier is not on the access point identifier block list of the second access terminal may include at least one of accessing a database, or receiving an indication that the second access point identifier is not on the access point identifier block list of the second access terminal.

The method may also include, prior to broadcasting the second access point identifier from the private access point, determining that the first access point identifier was at least recently on an access point identifier block list of a first access terminal of the access terminals. The first access terminal may be authorized on the private access point. In the method, determining that the first access point identifier was at least recently on the access point identifier block list of the first access terminal may include at least one of accessing a database, or receiving an indication that the first access point identifier was at least recently on the access point identifier block list of the first access terminal.

In the method, the second access point identifier may be configured to not be on an access point identifier block list of a first access terminal of the access terminals. The first access terminal may be authorized on the private access point.

The method may also include stopping broadcasting the second access point identifier when every access terminal that is authorized on the private access point is using the private access point.

In the method, the second access point identifier may never be included in a reject message sent from the private access point to any access terminal of the access terminals.

The method may also include, prior to broadcasting the second access point identifier from the private access point, determining that the private access point is within a removal window broadcast interval. In the method, broadcasting the second access point identifier from the private access point may include broadcasting the second access point identifier from the private access point in a greeting pilot signal. The removal window broadcast interval may include a greeting pilot broadcast interval.

In the method, broadcasting the second access point identifier from the private access point may include broadcasting the second access point identifier at least one of periodically or randomly.

In the method, broadcasting the second access point identifier from the private access point may include broadcasting the second access point identifier from the private access point instead of the first access point identifier.

In the method, broadcasting the first access point identifier from the private access point may include broadcasting the first access point identifier in a first pilot signal from the private access point, and, for at least some of a time that the first access point identifier is broadcast, broadcasting the first access point identifier concurrently with broadcasting the second access point identifier. In the method, broadcasting the second access point identifier from the private access point may include broadcasting the second access point identifier in a second pilot signal from the private access point. In the method, broadcasting the second access point identifier in the second pilot signal may include broadcasting the second access point identifier in a greeting pilot signal from the private access point.

In some aspects, a method includes assigning one or more reserved access point identifiers to a private access point network that includes two or more private access points, so that each private access point of the two or more private access points is assigned at least one reserved access point identifier of the one or more reserved access point identifiers. The method also includes configuring the two or more private access points of the private access point network so that each reserved access point identifier of the one or more reserved access point identifiers is never sent in any message from the private access point network that would cause the reserved access point identifier to be placed on an access point identifier block list of any access terminal in range of one or more private access points of the private access point network.

Implementations may include one or more of the following features.

In the method, the one or more reserved access point identifiers may include one or more reserved location area identifiers. The access point identifier block list may include a forbidden list.

In the method, configuring the two or more private access points may include configuring the two or more private access points of the private access point network so that each reserved access point identifier of the one or more reserved access point identifiers is never sent in any reject message originating from the private access point network.

In the method, assigning the one or more reserved access point identifiers to the private access point network may include assigning one reserved access point identifier to the private access point network so that each private access point of the two or more private access points is assigned the same one reserved access point identifier.

In the method, assigning the one or more reserved access point identifiers to the private access point network may include assigning a first reserved access point identifier of the one or more reserved access point identifiers to a first private access point of the two or more private access points. In the method, assigning the one or more reserved access point identifiers to the private access point network may also include assigning a second reserved access point identifier of the one or more reserved access point identifiers to a second private access point of the two or more private access points. The method may also include broadcasting the first reserved access point identifier in a first greeting pilot signal from the first private access point. The method may also include broadcasting the second reserved access point identifier in a second greeting pilot signal from the second private access point.

In some aspects, a method includes broadcasting a first location area identifier from a private access point in a radio access network. The private access point never includes the first location area identifier in any reject message sent from the private access point to any access terminal that communicates with the private access point such that the first location area identifier is configured to at least not be on a forbidden list of any access terminal that is authorized on the private access point.

Implementations may include one or more of the following features.

The method may also include stopping broadcasting the first location area identifier when every access terminal that is authorized on the private access point is using the private access point.

The method may also include broadcasting a second location area identifier from the private access point. In the method, broadcasting the first location area identifier from the private access point may include broadcasting the first location area identifier to attract to the private access point any access terminal that is authorized on the access terminal and that has the second location area identifier on the forbidden list of the access terminal.

The method may also include broadcasting a second location area identifier from the private access point. In the method, when the second location area identifier is being broadcast from the private access point, the first location area identifier may not be being broadcast from the private access point. In the method, broadcasting the first location area identifier from the private access point may include broadcasting the first location area identifier in a first pilot signal from the private access point. In the method, broadcasting the second location area identifier from the private access point may include broadcasting the second location area identifier in a second pilot signal from the private access point, and, for at least some of a time that the second location area identifier is broadcast, broadcasting the second location area identifier concurrently with broadcasting the first location area identifier. In the method, broadcasting the first location area identifier in the first pilot signal may include broadcasting the first location area identifier in a greeting pilot signal from the private access point.

In some aspects, a method includes broadcasting a first location area identifier in a first pilot signal from a private access point in a radio access network. The method also includes broadcasting a second location area identifier in a second pilot signal from the private access point. The method also includes, for at least some of a time that the first location area identifier is broadcast, broadcasting the first location area identifier concurrently with broadcasting the second location area identifier. The first pilot signal has a corresponding first scrambling code and the second pilot signal has a corresponding second scrambling code. The first scrambling code is different from the second scrambling code.

Implementations may include one or more of the following features.

The method may also include broadcasting a first neighbor list. The first neighbor list may include a third scrambling code. The third scrambling code may correspond to a macrocell access point. The method may also include broadcasting a second neighbor list. The second neighbor list may include the first scrambling code. In the method, broadcasting the second location area identifier in the second pilot signal may include broadcasting the second location area identifier in a greeting pilot signal from the private access point. In the method, broadcasting the second location area identifier in the second pilot signal may include receiving a first message from an access terminal, the access terminal being directed to the private access point by a third neighbor list broadcast by the macrocell access point. The third neighbor list may include the second scrambling code.

In some aspects, a method includes configuring a neighbor list for broadcast by a macrocell access point in a radio access network so that the neighbor list includes a private access point scrambling code. The private access point scrambling code corresponds to two or more pilot signals. Each pilot signal of the two or more pilot signals corresponds to a respective private access point of two or more private access points. The private access point scrambling code is configured to allow an access terminal that receives the neighbor list to decode any pilot signal of the two or more pilot signals that is received by the access terminal.

Implementations may include one or more of the following features.

In the method, the two or more pilot signals may include a reserved location area identifier. The two or private access points may be configured so that the reserved location area identifier is never sent in any message that would cause the reserved location area identifier be placed on a forbidden list of any access terminal in range of any of the two or more private access points.

In the method, the two or more pilot signals may include two or more respective greeting pilot signals.

In some aspects, a method includes compiling information regarding reject messages sent by private access points of radio access network to access terminals. The method also includes updating the information as new reject messages are sent by the private access points. The method also includes generating forbidden list models of the forbidden lists of the access terminals from the information. The forbidden list models include location area identifiers.

Implementations may include one or more of the following features.

The method may also include storing at least one of the information or the forbidden list models in a database.

The method may also include providing a private access point of the private access points with an indication when a forbidden list model of the forbidden list models includes a location area identifier that the private access point was at least recently broadcasting. The forbidden list model may correspond to an access terminal of the access terminals. The access terminal may be authorized on the private access point.

The method may also include receiving a location area identifier from a private access point of the private access points. The method may also include providing the private access point with an indication regarding whether any forbidden list model corresponding to any access terminal that is authorized on the private access point includes the location area identifier.

The method may also include storing at least one of the information or the forbidden list models in a database. The method may also include receiving a request from a private access point of the private access points. The method may also include providing the private access point with second information regarding at least one forbidden list model. The at least one forbidden list model may correspond to an access terminal of the access terminals. The access terminal may be authorized on the private access point.

In the method, updating the information as new reject messages are sent by the private access points may include receiving an indication that a private access point of the private access points has sent a reject message to an access terminal of the access terminals. The reject message may include a first location area identifier. In the method, updating the information as new reject messages are sent by the private access points may also include updating a forbidden list model of the forbidden list models with the first location area identifier, the forbidden list model corresponding to the access terminal with the first location area identifier. The method may also include locating the forbidden list model using an access terminal identifier provided by the private access point. The reject message may include a location area update reject message. The location area update reject message may include the first location area identifier. The method may also include sending a message to the private access point requesting the indication.

In some aspects, a method includes broadcasting a first location area identifier from a private access point in a radio access network. The method also includes broadcasting a second location area identifier from the private access point. The method also includes listening to information broadcast from a macrocell access point. The method also includes determining an interval within which to broadcast the second location area identifier using a portion of the information.

Implementations may include one or more of the following features.

In the method, broadcasting the second location area identifier from the private access point may include broadcasting the second location area identifier in a greeting pilot signal from the private access point. In the method, determining an interval within which to broadcast the second location area identifier may include determining the interval within which to broadcast the greeting pilot signal. In the method, broadcasting the second location area identifier from the private access point may include broadcasting the second location area identifier at least one of periodically or randomly. In the method, the portion of the information may include discontinuous receive cycle length parameters.

In some aspects, a method includes receiving a location area update request message from an access terminal. The location area update request message includes a first location area identifier. The location area update request message is received at a private access point in a radio access network. The method also includes sending an location area update accept message from the private access point to the access terminal in response to the location area update request message. The location area update accept message includes a second location area identifier.

In some aspects, a method includes broadcasting a first access point identifier from a first private access point in a radio access network. The method also includes receiving a first message from a first access terminal. The first message includes the first access point identifier. The method also includes determining whether the first access terminal is authorized or unauthorized on the first private access point. The method also includes, if the first access terminal is unauthorized, determining whether the first access point identifier is the same as an access point identifier of a second private access point on which the first access terminal is authorized. The method also includes, if the first access point identifier is the same as the access point identifier of the second private access point, broadcasting a second access point identifier from the first private access point.

Implementations may include one or more of the following features.

In the method, the first access point identifier may include a first location area identifier and the second access point identifier may include a second location area identifier. The access point identifier of the second private access point may include a location area identifier of the second private access point.

In the method, the first access terminal may be unauthorized on the first private access point. In the method, determining whether the first access terminal is authorized or unauthorized on the private access point may include determining that the first access terminal is unauthorized on the private access point.

In the method, determining whether the first access terminal is authorized or unauthorized on the private access point may include comparing an access terminal identifier of the access terminal to an access control list.

In the method, receiving the first message may include receiving a location area update request message from the first access terminal. The location area update request message may include the first access point identifier. The first access point identifier may include a first location area identifier. The method may also include receiving a second location area update request message from the first access terminal. The second location area update request message may include the second access point identifier. The second access point identifier may include a second location area identifier. The method may also include sending a location area update reject message to the first access terminal. The location area update reject message may include the second access point identifier.

The method may also include receiving a second message from the first access terminal. The second message may include the second access point identifier. The method may also include sending a reject message to the first access terminal. The reject message may include the second access point identifier. The method may also include sending an indication, to one or more other entities in the radio access network, that the first private access point has sent the reject message. The indication may be sent in order to cause the one or more other entities to update an access point identifier block list model with the second access point identifier. The access point identifier block list model may correspond to the first access terminal. In the method, the access point identifier block list model may include a forbidden list model.

In the method, determining whether the first access point identifier is the same as the access point identifier of the second private access point may include at least one of accessing a database, or receiving an indication regarding whether the first access point identifier is the same as the access point identifier of the second private access point. The method may also include sending a second indication to one or more other entities in the radio access network that the second access point identifier is being broadcast from the first private access point to cause the one or more other entities to update the database.

The method may also include, if the first access point identifier is the same as the access point identifier of the second private access point, selecting the second access point identifier for broadcast. The method may also include stopping broadcasting the first access point identifier when the second access point identifier is selected. In the method, selecting the second access point identifier for broadcast may include determining whether a potential second access point identifier is at least likely to be on any access point identifier block list of any access terminal that is authorized on the first private access point. In the method, selecting the second access point identifier for broadcast may further include, if the potential second access point identifier is at least unlikely to be on any access point identifier block list of any access terminal that is authorized on the first private access point, the potential second access point identifier becomes the second access point identifier.

The method may also include, if the first access point identifier is the same as the access point identifier of the second private access point, selecting the second access point identifier for broadcast. The method may also include stopping broadcasting the first access point identifier when the second access point identifier is selected. In the method, selecting the second access point identifier for broadcast may include determining whether a potential second access point identifier is at least likely to be on any access point identifier block list of any access terminal that is authorized on the first private access point. In the method, selecting the second access point identifier for broadcast may further include, if the potential second access point identifier is at least likely to be on any access point identifier block list of any access terminal that is authorized on the first private access point, selecting a new potential second access point identifier. In the method, selecting the second access point identifier for broadcast may further include determining whether the new potential second access point identifier is at least likely to be on any access point identifier block list of any access terminal that is authorized on the first private access point.

The method may also include, if the first access point identifier is the same as the access point identifier of the second private access point, selecting the second access point identifier for broadcast. The method may also include stopping broadcasting the first access point identifier when the second access point identifier is selected. In the method, selecting the second access point identifier for broadcast may include determining whether a potential second access point identifier is at least likely to be on any access point identifier block list of any access terminal that is authorized on the first private access point. In the method, determining whether the potential second access point identifier is likely to be on any access point identifier block list of any access terminal that is authorized on the first private access point may include at least one of accessing a database, or receiving an indication regarding whether the potential second access point identifier is likely to be on any access point identifier block list of any access terminal that is authorized on the first private access point. In the method, accessing the database may include accessing the database, where the database may store at least one of access point identifier block list models corresponding to access terminals, or information regarding the access point identifier block list models. The access terminals may include any access terminals that are authorized on the first private access point. In the method, receiving the indication regarding whether the potential second access point identifier is likely to be on any access point identifier block list of any access terminal that is authorized on the first private access point may include receiving the indication, where the indication may be based on at least one of access point identifier block list models corresponding to access terminals, or information regarding the access point identifier block list models, wherein the access terminals include any access terminals that are authorized on the first private access point.

The method may also include, if the first access point identifier is not the same as the access point identifier of the second private access point, and if the first access point identifier is not the same as any access point identifier of any other private access point on which the first access terminal is authorized, sending a reject message to the first access terminal. The reject message may include the first access point identifier. In the method, sending a reject message to the first access terminal may include sending a location area update reject message to the first access terminal. The location area update reject message may include the first access point identifier. The first access point identifier may include a first location area identifier. The method may also include sending an indication, to one or more other entities in the radio access network, that the first private access point has sent the reject message. The indication may be sent in order to cause the one or more other entities to update an access point identifier block list model with the first access point identifier. The access point identifier block list model may correspond to the first access terminal.

In some aspects, a method includes broadcasting a first access point identifier from a first private access point in a radio access network. The method also includes determining whether a first access point identifier was at least recently on an access point identifier block list of a first access terminal that is authorized on the first private access point. The method also includes, if the first access point identifier was at least recently on the access point identifier block list; broadcasting a second access point identifier from the first private access point.

Implementations may include one or more of the following features.

In the method, the first access point identifier may include a first location area identifier and the second access point identifier may include a second location area identifier. The access point identifier block list may include a forbidden list.

The method may also include receiving a first message from the first access terminal. The first message may include the second access point identifier. The method may also include determining whether the first access terminal is authorized or unauthorized on the first private access point. In the method, when the first access terminal sends the first message, the first access point identifier may be on the access point identifier block list of the first access terminal. In the method, determining whether the first access terminal is authorized or unauthorized on the private access point may include comparing an access terminal identifier of the first access terminal to an access control list.

The method may also include receiving a first message from the first access terminal. The first message may include the second access point identifier. The method may also include determining whether the first access terminal is authorized or unauthorized on the first private access point. In the method, determining whether the first access terminal is authorized or unauthorized on the private access point may include determining that the first access terminal is authorized on the first private access point. In the method, receiving the first message may include receiving a location area update request message from the first access terminal. The location area update request message may include the second access point identifier. The second access point identifier may include a second location area identifier. The method may also include sending a location area update accept message to the first access terminal. The location area update accept message may include the second access point identifier. The method may also include receiving a second location area update request message from a second access terminal. The second location area update request message may include the second access point identifier. The second access terminal may be unauthorized on the first private access point. The method may also include determining that the second access terminal is unauthorized on the first private access point. The method may also include sending a location area update reject message to the second access terminal. The fourth message may include the second access point identifier.

The method may also include receiving a first message from the first access terminal. The first message may include the second access point identifier. The method may also include determining whether the first access terminal is authorized or unauthorized on the first private access point. The method may also include sending a second message to the first access terminal. The second message may include the second access point identifier. The method may also include receiving a third message from a second access terminal. The third message may include the second access point identifier. The second access terminal may be unauthorized on the first private access point. The method may also include determining that the second access terminal is unauthorized on the first private access point. The method may also include sending a reject message to the second access terminal. The fourth message may include the second access point identifier. The method may also include sending an indication, to one or more other entities in the radio access network, that the first private access point has sent the reject message. The indication may be sent in order to cause the one or more other entities to update an access point identifier block list model with the second access point identifier. The access point identifier block list model may correspond to the second access terminal. In the method, the access point identifier block list model may include a forbidden list model.

In the method, determining whether the first access point identifier was at least recently on the access point identifier block list of the first access terminal may include at least one of accessing a database, or receiving an indication regarding whether the first access point identifier was at least recently on the access point identifier block list of the first access terminal. In the method, accessing the database may include accessing the database at least one of periodically or randomly. In the method, accessing the database may include accessing the database, where the database may store at least one of access point identifier block list models corresponding to access terminals, or information regarding the access point identifier block list models. The access terminals may include the first access terminal and any other access terminals that are authorized on the first private access point. In the method, receiving the indication regarding whether the first access point identifier was at least recently on the access point identifier block list of the first access terminal may include receiving the indication, where the indication may be based on at least one of access point identifier block list models corresponding to access terminals, or information regarding the access point identifier block list models. The access terminals may include the first access terminal and any other access terminals that are authorized on the first private access point.

The method may also include, if the first access point identifier was at least recently on the access point identifier block list of the first access terminal, selecting the second access point identifier for broadcast. The method may also include stopping broadcasting the first access point identifier when the second access point identifier is selected. In the method, selecting the second access point identifier for broadcast may include determining whether a potential second access point identifier is at least likely to be on any access point identifier block list of any access terminal that is authorized on the first private access point. In the method, selecting the second access point identifier for broadcast may further include, if the potential second access point identifier is at least unlikely to be on any access point identifier block list of any access terminal that is authorized on the first private access point, the potential second access point identifier may become the second access point identifier. In the method, selecting the second access point identifier for broadcast may further include, if the potential second access point identifier is at least likely to be on any access point identifier block list of any access terminal that is authorized on the first private access point, selecting a new potential second access point identifier. In the method, selecting the second access point identifier for broadcast may further include determining whether the new potential second access point identifier is at least likely to be on any access point identifier block list of any access terminal that is authorized on the first private access point. In the method, determining whether the potential second access point identifier is likely to be on any access point identifier block list of any access terminal that is authorized on the first private access point may include at least one of accessing a database, or receiving an indication regarding whether the potential second access point identifier is likely to be on any access point identifier block list of any access terminal that is authorized on the first private access point. In the method, accessing the database may include accessing the database, where the database may store at least one of access point identifier block list models corresponding to access terminals, or information regarding the access point identifier block list models. The access terminals may include any access terminals that are authorized on the first private access point. In the method, receiving the indication regarding whether the potential second access point identifier is likely to be on any access point identifier block list of any access terminal that is authorized on the first private access point may include receiving the indication, where the indication may be based on at least one of access point identifier block list models corresponding to access terminals, or information regarding the access point identifier block list models. The access terminals may include any access terminals that are authorized on the first private access point.

Advantages may include one or more of the following. The likelihood of an authorized AT becoming blocked from its home private access point due to the home private access point's access point identifier being placed on the AT's access point identifier block list may be reduced. The frequency with which ATs that are not authorized on a particular private access point will reattempt to camp on the private access point may be reduced. This may limit or avoid excessive messaging traffic between the private access point and a core network with which the private access point. Likewise, this may reduce or prevent excessive drain on the battery of the unauthorized AT. Potential obstacles to the ability of a core network to move an in-progress call between an authorized AT and a home private access point of the AT from the home private access point to a macrocell access point without incident may be removed. The ability of AT to make an emergency call using a private access point that the AT is not authorized to use may be retained.

The foregoing methods may be implemented as one or more machine-readable media storing instructions that are executable on one or more processing devices to implement the methods. The one or more machine-readable media may include one or more computer-readable media. The foregoing methods may be implemented as a computer program product comprised of instructions that are stored on one or more machine-readable media, and that are executable on one or more processing devices. The foregoing methods may be implemented as an apparatus or system that includes one or more processing devices and memory to store executable instructions to implement the methods. For example, the foregoing methods may be implemented as a private access point that includes one or more processing devices and memory to store executable instructions to implement the methods.

For example, in some aspects, one or more machine-readable media store executable instructions. The instructions are for causing one or more processing devices to broadcast a first access point identifier from a private access point in a radio access network. The instructions are also for causing the one or more processing devices to broadcast a second access point identifier from the private access point. The instructions are also for causing the one or more processing devices to receive a first message from a first access terminal that is authorized on the private access point. The first message includes the second access point identifier. The instructions are also for causing the one or more processing devices to send a second message to the first access terminal. The second message includes the first access point identifier. The second message is configured to cause the first access terminal to remove the first access point identifier from an access point identifier block list of the first access terminal if the first access point identifier is on the access point identifier block list of the first access terminal. The one or more machine-readable media may include one or more computer-readable media.

For example, in some aspects, a private access point includes a memory and one or more processing devices. The memory is configured to store instructions for execution. The one or more processing devices are configured to execute the instructions. The instruction are for causing one or more processing devices to broadcast a first access point identifier from the private access point in a radio access network. The instructions are also for causing the one or more processing devices to broadcast a second access point identifier from the private access point. The instructions are also for causing the one or more processing devices to receive a first message from a first access terminal that is authorized on the private access point. The first message includes the second access point identifier. The instructions are also for causing the one or more processing devices to send a second message to the first access terminal. The second message includes the first access point identifier. The second message is configured to cause the first access terminal to remove the first access point identifier from an access point identifier block list of the first access terminal if the first access point identifier is on the access point identifier block list of the first access terminal.

The details of one or more examples are set forth in the accompanying drawings and the description below. Further features, aspects, and advantages are apparent in the description, the drawings, and the claims.

DETAILED DESCRIPTION

Figure 1:
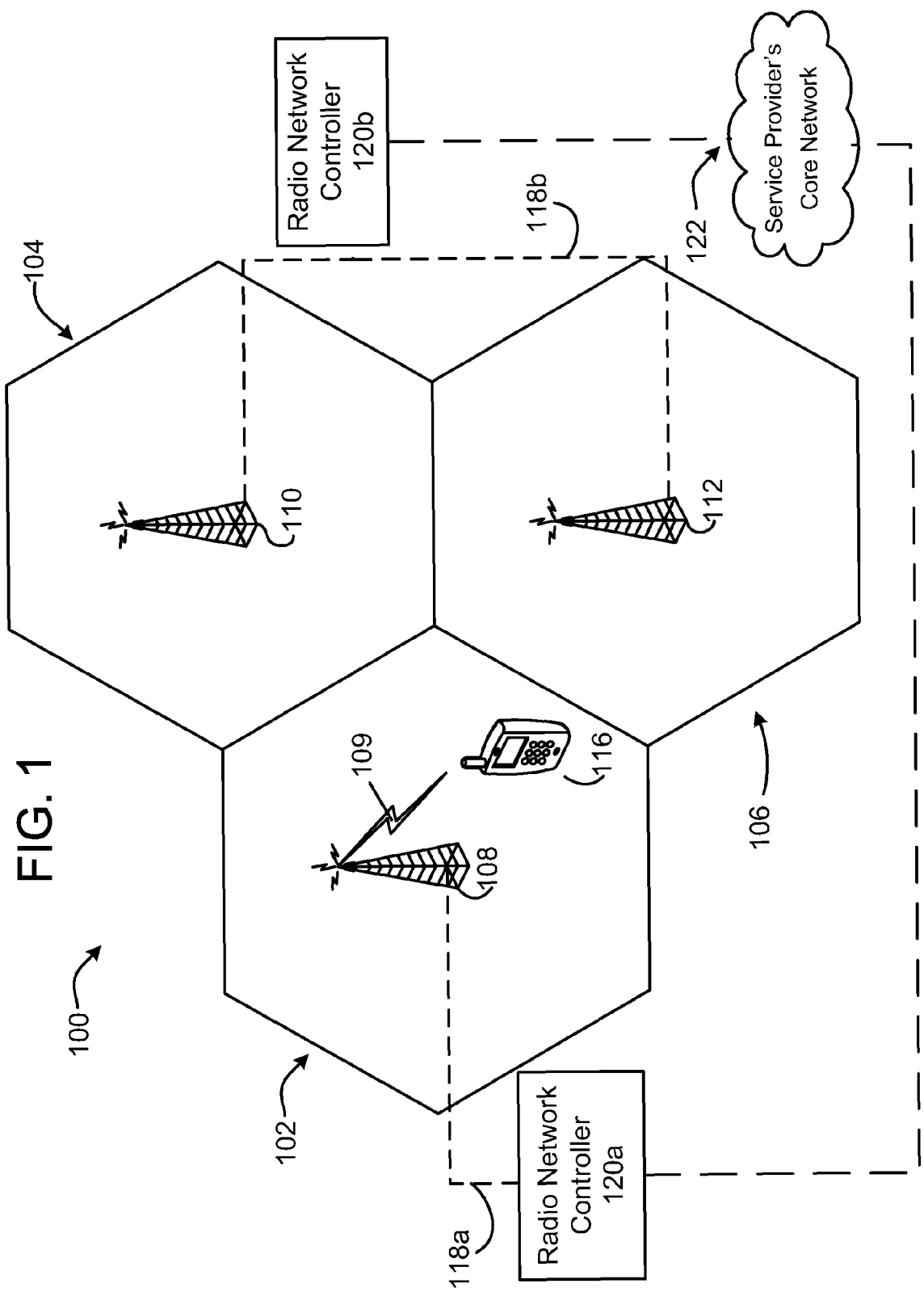
FIG. 1 is a diagram of a radio access network (RAN).

In wireless communication networks generally, the geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas." An access point that serves a femtocell area is referred to as a "femtocell access point." A macrocell, for example, may provide coverage to an area of a few blocks, while a femtocell access point may provide coverage to an area spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of access terminals at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a home, an office, a public space, or a restaurant. For ease of description, private access points will be described hereinafter as femtocell access points or FAPs.

For communications between access terminals and access points generally, a call established between an access point and an access terminal may be transferred to another access point in a process referred to as a "handoff". From the point of view of a particular access point, there are 2 types of handoffs: a "hand-out" moves an in-progress call out to a neighboring access point (allowing the access point to free up its resources) and a "hand-in" occurs when a neighboring access point transfers an in-progress call into the access point (the access point needs to allocate resources to service the call).

A handoff may be performed for a variety of different reasons. Typically, a handoff occurs when an access terminal moves into a different coverage area. For example, a call that has been established with a macrocell may be transferred to a neighboring macrocell when the access terminal moves outside of the service area covered by the macrocell. A handoff may also occur when the capacity for connecting new calls to a particular macrocell is reached. In this scenario, the macrocell may transfer an existing call (or a new call) to another macrocell with overlapping coverage.

Hand-offs between macrocells and femtocells may occur for similar/other reasons. A femtocell hand-in may occur when an access terminal determines that a neighboring femtocell can provide faster and/or more robust communications with the access terminal than can the macrocell. For example, the access terminal could be located in closer geographic proximity to the femtocell or there may be fewer obstructions in the communication path between the femtocell and the access terminal. Femtocell hand-in may occur whenever a femtocell signal is detected by the access terminal because it is operator policy to prefer femtocell usage over macrocell.

To facilitate a handoff, an access terminal identifies nearby macrocells or femtocells from information provided by the access point which is currently servicing the call. The information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many hand-off processes, for example, an access terminal selects a scrambling code of a nearby access point from the neighbor list received from its current access point. The access terminal uses the scrambling code to decode a pilot signal that is continuously transmitted by the nearby access point in order to determine the quality of the communication channel between itself and that access point. For example, the access terminal can determine the signal-to-noise ratio, and the bandwidth of the communication channel. If the access terminal determines that the communication channel is of sufficient quality, it establishes communication with the nearby access point. Otherwise, the access terminal selects the scrambling code of a different access point from the neighbor list, tests the associated pilot signal, and repeats the process until a suitable access point is determined.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with an access terminal over an airlink. For example, macrocell 108 communicates with access terminal (AT) 116 over an airlink 109. Macrocells 108, 110, and 112 are connected over a backhaul connection (e.g., backhaul connection 118*a* or 118*b*) to a radio network controller (RNC) which in turn communicates with the service provider's core network 122, e.g., via RNC 120*a* or 120*b*, which may be one or more physical devices at different locations.

The RAN 100 is configured to support various mobile wireless access technologies, examples of which include Universal Mobile Telecommunications System (UMTS) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1x EV-DO, CDMA2000, WiMax, WiBro, WiFi, and the like.

The following sections of the 3GPP Standard are hereby incorporated by reference in their entirety:

- 3GPP Technical Specification 25.331 version 8.3.0 Release 8, 2008-07, Universal Mobile Telecommunications System (UMTS); Radio Resource Control (RRC); Protocol specification;
- 3GPP Technical Specification 25.304 version 7.6.0 Release 7, 2008-07, Universal Mobile Telecommunications System (UMTS); User Equipment (UE) procedures in idle mode and procedures for cell reselection in connected mode;
- 3GPP Technical Specification 25.133 version 8.3.0 Release 8, 2008-06, Universal Mobile Telecommunications System (UMTS); Requirements for support of radio resource management (FDD);
- 3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and
- 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
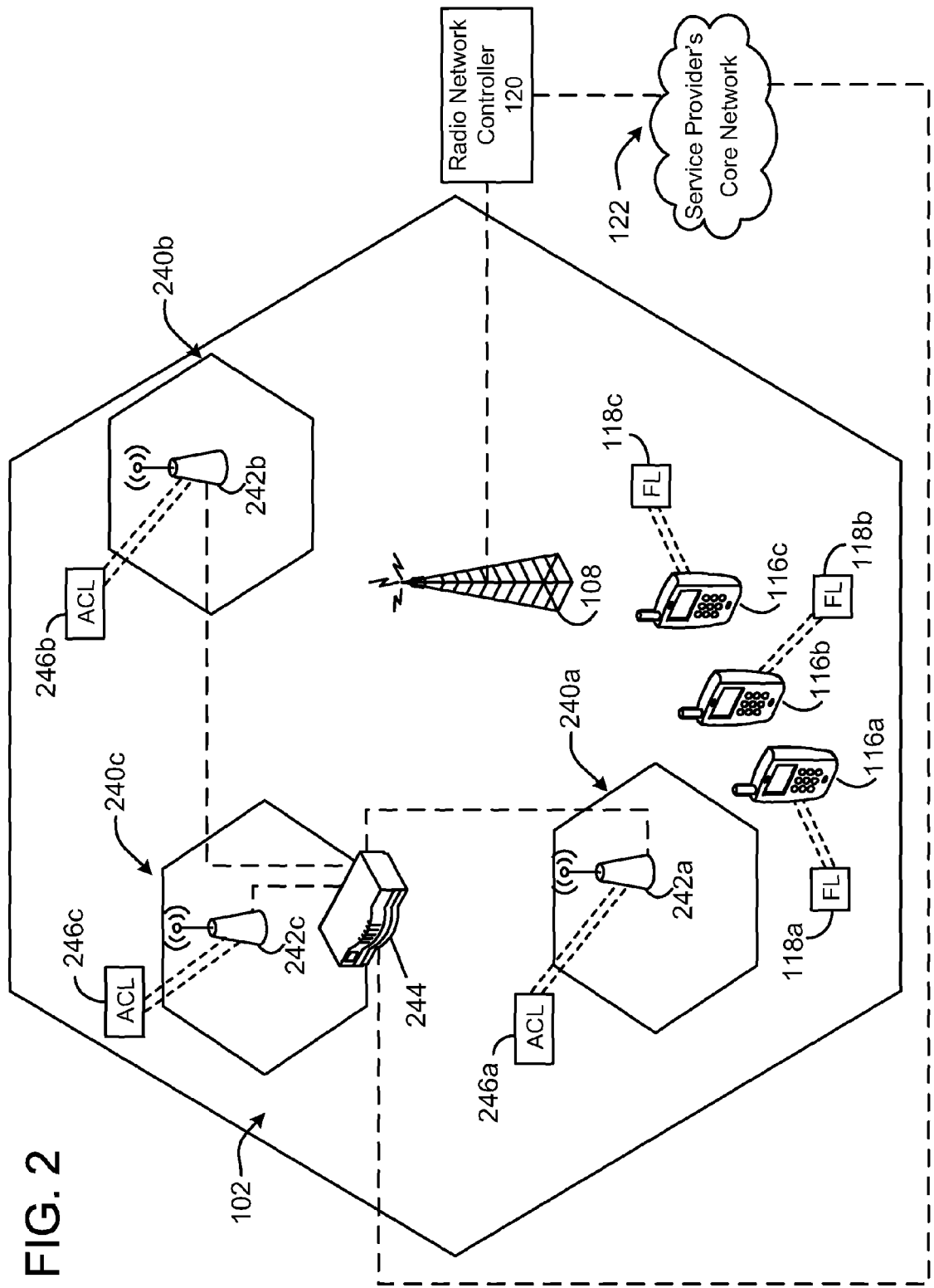
FIG. 2 is a diagram of a femtocell deployment within a macrocell area of the RAN of FIG 1.

Referring to FIG. 2, it is diagram showing a femtocell deployment in the macrocell service area 102 of the RAN 100 of FIG. 1. The service area 102 of macrocell 108 includes femtocell areas 240*a*, 240*b*, and 240*c* served by femtocell access points (FAPs) 242*a*, 242*b*, and 242*c*, respectively. Hereinafter, the femtocell access points 242*a*, 242*b*, and 242*c* are referred to as "FAPs 242*a*, 242*b*, and 242*c*." Although, only three FAPs are shown in FIG. 2, in practice a macrocell area can include many more FAPs. For example, a macrocell area could include hundreds, thousands, or hundreds of thousands of FAPs.

A femtocell server 244 is in communication with one or more of the FAPs 242*a*-*c*. The femtocell server 244 maintains active associations between access terminals such as access terminals (ATs) 116*a*, 116*b*, and 116*c* and the FAPs 242*a*-*c* so that a hand-in request from the macrocell 108 (or other components of the mobile core network) can be directed to the correct FAP. One or more of the FAPs 242*a*-*c* and the femtocell server 244 may be combined as a single device. In early deployment, the femtocell server 244 may present a similar, conventional system interface as that of RNC 120 to the existing core network infrastructure 122. References to the core network 122 may in some cases be a shorthand for a reference to the femtocell server 244, and in some implementations, certain functions of the core network 122 may be included in the femtocell server 244 and vice versa. For example, when reference is made to a FAP accessing stored information from the core network 122, all or part of the information might be stored on the core network 122 and/or the femtocell server 244.

Each of the FAPs 242*a*-*c* is generally configured to continuously transmit or broadcast a main pilot signal. The main pilot for a FAP is decoded with a main scrambling code assigned to that particular FAP. The terms "main scrambling code" and "main pilot" may also be referred to as "operating scrambling code" and "operating pilot," respectively. The FAPs' main scrambling codes may be assigned with maximum geographic dispersal in order to minimize radio interference probability (given that they may be reused within a macrocell area in a dense deployment). The main scrambling codes assigned to the FAPs 242*a*-*c* may be stored in the neighbor list of the macrocell 108.

In some implementations, one or more FAPs may also be configured to transmit a second pilot signal concurrently with the main pilot. This second pilot signal is designated the "greeting pilot" ("GP"). Certain implementations of greeting pilots are described in more detail in U.S. patent application Ser. No. 11/960,026, entitled "Proximity Detection In A Network", filed Dec. 19, 2007, and hereby incorporated by reference in its entirety. In FAP implementations that include greeting pilots, the greeting pilot may be, for example, encoded/decoded using a scrambling code selected from, e.g., a set of "greeting scrambling codes". The greeting scrambling codes of the FAPs 242*a*-*c* may be populated in the neighbor list of the macrocell 108 instead of the main scrambling codes assigned to FAPs 242*a*-*c*. Thus, the main scrambling codes assigned to the FAPs 242*a*-*c* may generally be different from the set of greeting scrambling codes stored in the neighbor list of the macrocell 108. This may remove restrictions on the size of the available set of main scrambling codes for FAPs that may exist when greeting pilots are not implemented on particular FAP deployments. The set of greeting scrambling codes may be relatively small (e.g., between 1 and 4) compared to a total number of main scrambling codes assigned to the FAPs within a macrocell area. If different FAPs, or even all FAPs in a FAP deployment, share identical greeting scrambling codes for their greeting pilots, then the macrocell 108 may include as few as one greeting scrambling code in the macrocell's 108 neighbor list for the FAP deployment, which may reduce the number of required neighbor list entries on the neighbor list of the macrocell 108.

In FAP deployments that include greeting pilots, each single FAP may be referred to as including a "femtocell access point greeting pilot" ("FAP GP") and a "femtocell access point service cell" ("FAP service cell"; or "FAP SC"). Operation of FAP having a FAP GP and a FAP service cell is explained in more detail below and later with references to certain example implementations of closed access control techniques.

Although the main pilots of the FAPs 242*a*-*c* are generally always on, e.g., continuously transmitted while the FAPs 242*a*-*c* are in service, in FAP implementations that include greeting pilots, the greeting pilots of the FAPs 242*a*-*c* may be left on at all times, may turned on and off periodically, or may normally be turned off. A FAP (e.g., FAP 242a) may turn on its greeting pilot when it wants to invite an access terminal that may be in the vicinity into its service area.

Furthermore, in FAP implementations having greeting pilots, the macrocell 108 may not announce the main scrambling codes of the FAPs 242a-c in its neighbor list. Accordingly, when the greeting pilot on a FAP is turned off, the FAP (e.g., FAP 242) may be "invisible" to an access terminal.

Femtocell access point systems typically perform some type of closed access control. Closed access control means, e.g., that access to each femtocell access point is limited in some fashion, i.e., not every access terminal may "camp" on the femtocell and/or utilize the services of the femtocell. For example, an owner of a FAP may like to control which access terminals are allowed to camp on and register with the core network 122 via the FAP to use normal service (e.g., non-emergency service).

Access terminals (ATs) may be "authorized" or "not authorized" ("unauthorized") to camp on and/or use services of a FAP. Each FAP of the FAPs 242a-c may include an authorization list, or "access control list", which may be stored in memory on the FAP. See, e.g., access control lists (ACLs) 246a, 246b, 246c stored on respective FAPs 242a, 242b, 242c in FIG. 2. The access control list for a particular FAP includes identities of ATs that are authorized on that FAP. ATs that are not identified on the access control list of a particular FAP are not authorized on that FAP. A particular AT may be authorized on one FAP and unauthorized on another FAP. From the perspective of a FAP, an AT is either an authorized access terminal (AAT) or an unauthorized access terminal (UAT). From the perspective of an AT, a FAP is either an authorized FAP (e.g., a "home" FAP that the AT is authorized on), or an unauthorized FAP (e.g., a "foreign" FAP that the AT is not authorized on). A "home" FAP need not be located in a user's home and may, e.g., be located in an office building, or a public place. Likewise, a "foreign" FAP may be located, e.g., in close physical proximity to a user's "home" FAP but still be "foreign" from the perspective of the AT. Just as a FAP may identify more than one authorized AT in its access control list, an AT may be authorized on more than one FAP (and thus may have more than one authorized FAP or "home" FAP). Hereafter, for ease of description, a home FAP for an access terminal will be referred to as though it is the only home FAP for the access terminal. Access control lists may be updated periodically by, e.g., an administrator or operator of the core network, e.g., the core network 122.

Since an access control list of a FAP may change from time to time, a particular AT may "change" from being an authorized AT (AAT) at one point in time to being an unauthorized AT (UAT) for that FAP. Similarly, from the perspective of the "changing" AT, what was once an authorized FAP (e.g., a "home" FAP") when the AT was an AAT for that FAP, becomes an unauthorized FAP (e.g., a "foreign" FAP") when the AT becomes a UAT for that same FAP.

In portions of the following description, the AT 116a is referred to as being an authorized AT on the FAP 242a, and the FAP 242a is referred to as being a home FAP for, or from the perspective of, the AT 116a. At the same time, the AT 116a is referred to as being an unauthorized AT with respect to the FAP 242b, and the FAP 242b is referred to as being a foreign FAP for, or from the perspective of, the AT 116a. In analogous fashion, e.g., the AT 116b is referred to as being an authorized AT on the FAP 242b and an unauthorized AT on the FAP 242a. References to ATs 116a-c as authorized ATs and/or unauthorized ATs and FAPs 242a-c as home FAPs and/or foreign FAPs are merely examples. Thus, the FAPs 242a, 242b, and 242c may be home FAPs for one or more ATs and may, e.g., simultaneously be foreign FAPs for one or more other ATs. The ATs 116a-c may be authorized ATs for one or more FAPs and may, e.g., simultaneously, be unauthorized ATs for one or more other FAPs.

Examples of AT identifiers that may be used in an access control list on a particular FAP may include the International Mobile Subscriber Identity (IMSI) of the AT. While the AT may also use a temporary identifier such as a Temporary Mobile Subscriber Identity (TMSI) in initial communications with a FAP, access control lists may generally include the unique IMSI of the AT rather than the TMSI.

In, e.g., a wireless network such as a UMTS network, each access point is assigned an access point identifier such as a Location Area Identifier. Location Area Identifiers are explained in more detail in, e.g., 3GPP Technical Specification 23.003, section 4.4.4.6. The Location Area Identifier (LAI) of the access point is broadcast to ATs. When camping on an access point, the AT issues a Location Area Update Request message that contains the LAI assigned to that access point. That Location Area Update Request message is forwarded by the access point to the core network and the core network returns a message to the AT that, e.g., allows that AT to camp on the access point to use normal service (e.g., non-emergency service) or that rejects the AT's Location Area Update Request to disable normal service (e.g., unless the AT is trying to make an emergency call form the FAP). Once camped on an access point with a particular LAI, the AT can move into the coverage area of another access point with the same LAI without issuing a new Location Area Update Request. The AT issues a new Location Area Update Request message when the AT moves into the coverage area of an access point with a different LAI. The AT may also issue the Location Area Update Request periodically to inform an access point that the AT is still in the vicinity of the access point.

A LAI is an example of an access point identifier. In wireless networks that use other air interface standards, an access point identifier other than a LAI may be used in, e.g., access control.

When an AT moves into the coverage area of a FAP, the AT will generally issue a Location Area Update Request message containing the LAI assigned to that FAP. Thus, even an AT that is unauthorized on a particular FAP but that is in range of or in the coverage area of the FAP will generally attempt to camp on the FAP and do Location Area registration with the core network (e.g., core network 122) using the Location Area Update Request message. In order to support a form of closed access control, Location Area Update Request messages from unauthorized ATs should be rejected to prevent the unauthorized ATs from camping on the FAP to use normal service. If Location Area Update requests from unauthorized ATs are not rejected by the FAP in some fashion, then unauthorized ATs that remain in range of the FAP will generally keep retrying the Location Area Update Requests, which drains the battery and shortens the battery life of the ATs. Other issues may arise when Location Area Update requests from unauthorized ATs are not properly rejected. In a situation in which a FAP is surrounded by unauthorized ATs, for example in a crowded area, the FAP may become overloaded in handling Location Area Update requests. If the FAP passes messages from ATs to the core network without first confirming that the ATs originating the messages are authorized on the FAP, then, due to the potential volume of requests from unauthorized ATs, excessive messaging traffic between the FAP and the core network may become an issue. On the other hand, it is possible for a FAP to reject an unauthorized AT completely, or effectively completely. However, since some core network operators consider it desirable for any AT, even an unauthorized AT, to make emergency calls using a FAP, such rejection methods that block unauthorized ATs from making even emergency calls may be undesirable.

An AT in, e.g., a UMTS network will generally include an access point identifier block list such as a "forbidden list" stored in the AT's internal memory. See, e.g., forbidden lists (FLs) 118a-118c stored on respective ATs 116a-c in FIG. 2. In the 3GPP Standard, an AT's forbidden list may be referred to as a "list of 'forbidden location areas for roaming'". The AT's forbidden list includes entries of access point LAIs. The forbidden list is often limited to a small number of entries, for example, around 10 LAI entries under the 3GPP Standard, with the 3GPP Standard setting a minimum of 10 LAI entries. Generally, if a LAI is on an AT's forbidden list, the AT will not send (or is blocked from sending) Location Area Update Request messages to access points that use that LAI for a significant period of time, for example, 24 hours. However, an AT is generally permitted to make emergency calls using an access points whose LAI is on the forbidden list. Access point LAI entries on an AT's forbidden list may be cleared in, e.g., the following circumstances: when the time period (e.g., 24 hours) elapses, when the AT is turned off, when the AT's SIM card is removed, or when more LAIs than the capacity of the forbidden list are added to the forbidden list. Typically, adding a LAI to a full forbidden list purges the oldest LAI entry from the forbidden list.

Generally, when a Location Area Update Request message received from an AT is rejected by an access point proxying core network function or a core network communicating with the access point, the access point or core network may return a reject cause code to the AT. In a UMTS network, there are several reject cause codes of "permanent effect" that cause an AT to store the LAI (of the access point sending the reject cause code) in the AT's forbidden list. The AT is then blocked from sending Location Area Update Request messages to any access points using that stored LAI, until such time as the stored LAI is e.g., cleared from the forbidden list.

In general, there may be a limited pool of LAIs available to FAP network deployments. There is an upper limit of 65,536 different LAIs that may be used in a UMTS network. For other reasons (described below), a core network operator may restrict the pool of LAIs available to a FAP network even further. An AT may encounter many hundreds of FAPs as the AT is roaming around a densely populated area. If, for example, each FAP is assigned one LAI, then due to the limits on LAIs there will be at least some duplication of the LAIs assigned to different FAPs. There is a reasonable probability that an AT will roam near an unauthorized FAP (e.g., a "foreign FAP"; a FAP that the AT is not authorized to use) that has the same LAI with an authorized FAP for that AT (e.g., a "home" FAP; a FAP which the AT is authorized to use). If that unauthorized or foreign FAP with that LAI rejects the AT's Location Area Update Request message by using a reject cause code of permanent effect, then the identical LAI being used by the authorized or home FAP will be placed on the AT's forbidden list, and the AT will not be able to camp on the authorized FAP for normal service (e.g., non-emergency service). This presents challenges for a user returning to the vicinity of the user's authorized FAP since, in order to for the user's AT to use the authorized FAP, the user would generally be required to turn the AT on and off to clear the AT's forbidden list.

Figure 3:
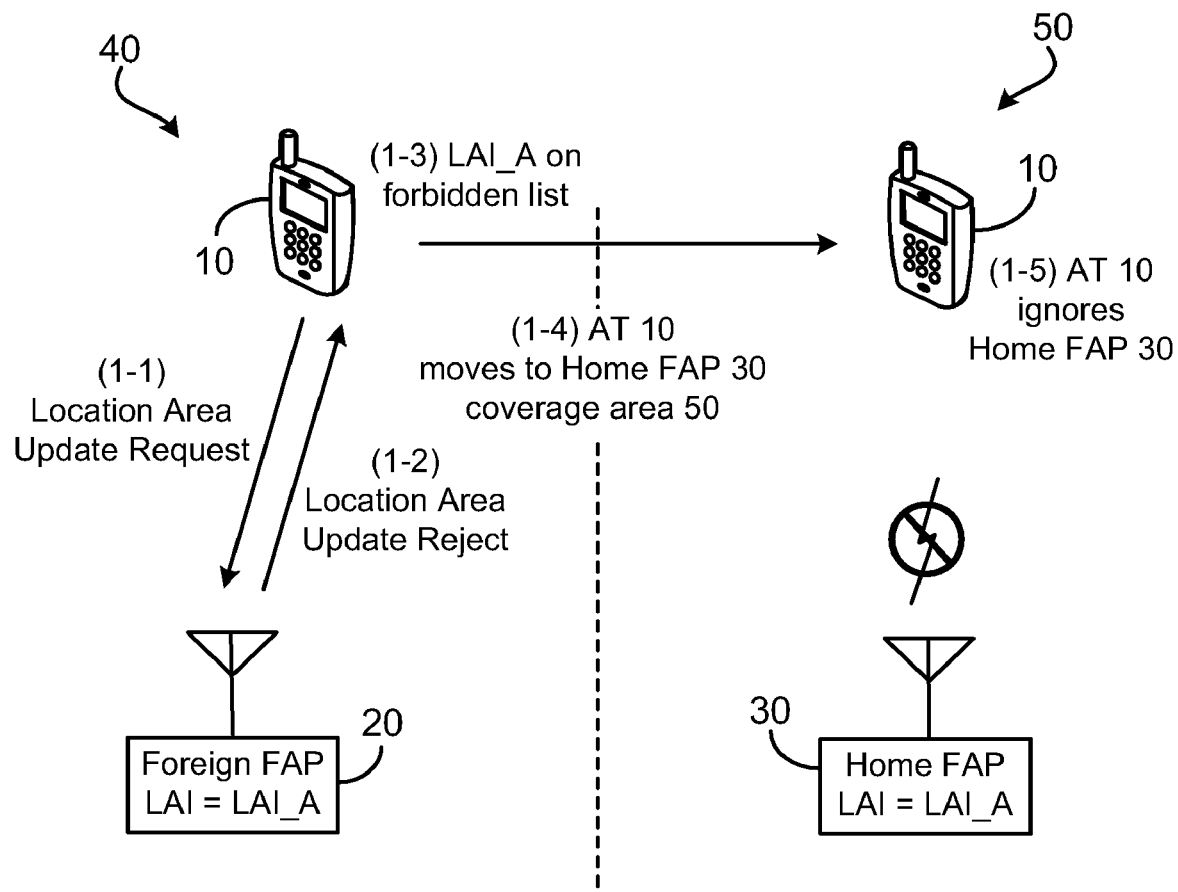
FIG. 3 is a diagram illustrating two femtocells and an access terminal.

FIG. 3 is a diagram illustrating an access terminal (AT) 10, a first femtocell access point 20 and a second femtocell access point 30. The first FAP 20 is an unauthorized or foreign FAP for the AT 10, while the second FAP 30 is an authorized or home FAP for the AT 10. That is, the AT 10 is not authorized on the first FAP 20 and is authorized on the second FAP 30. The first FAP 20 uses and broadcasts the same LAI, "LAI_A", as the second FAP 30. FIG. 3 illustrates the problem of the AT 10 becoming unable to access its home FAP 30 after a Location Area Update Request message from the AT 10 is rejected by the foreign FAP 20 and the LAI, LAI-A is added to the forbidden list of the AT. When the AT 10 is in the coverage area 40 of the foreign FAP 20, the AT 10 sends (1-1) a Location Area Update Request message to the foreign FAP 20. Upon receiving the Location Area Update Request message, the foreign FAP 20 determines that the AT 10 is unauthorized. In order to keep the AT 10 from repeatedly trying to camp on and/or use the foreign FAP 20, the FAP 20 rejects the Location Area Update Request message by sending (1-2) a Location Area Update Reject message to the AT 10. The Location Area Update Reject message includes a reject cause code of permanent effect that requires the AT 10 to put (1-3) LAI-A (the LAI broadcast by foreign FAP 20) on the AT's 10 forbidden list. Later, when the AT 10 moves (1-4) into the coverage area 50 of its home FAP 30, the AT 10 will hear a broadcast message from the FAP 30 that includes LAI_A (the same LAI used by foreign FAP 20), and the AT 10 will find that LAI_A is on its forbidden list. Even though the AT 10 is authorized on the home FAP 30, the AT 10 will simply ignore (1-5), and not attempt to connect to or camp onto, the home FAP 30 to use normal service. This results in an undesirable service outage at the FAP 30 for the authorized AT 10.

Thus, when an AT goes to a FAP that the AT is not authorized on, and that has the same LAI as a home FAP that the AT is authorized on, the foreign FAP may reject the AT in such a way that the LAI of the foreign FAP gets placed on the AT's forbidden list. The AT is then "blocked" from using the home FAP with the LAI.

Private Access Point Access Control Techniques

In general, in a wireless network, problematic issues such as the LAI of an AT's home FAP ending up on the forbidden list of the AT may be avoided by several techniques and/or combinations of access control techniques. For example, some techniques involve a FAP, under certain circumstances, changing the LAI that the FAP broadcasts to ATs in its coverage area. Some techniques involve a FAP changing the LAI that the FAP broadcasts to another LAI that is different from the LAI of the AT's home FAP, so that the FAP's previously broadcast LAI is not placed on the forbidden list of the AT. Some techniques involve changing the LAI that the FAP broadcasts to a "reserved" LAI which is generally guaranteed not to be on the forbidden list of an AT that is authorized to use the FAP. Some techniques involve a forbidden list removal procedure in which a LAI of a FAP is removed from an authorized AT's forbidden list. Some techniques involve using a greeting pilot on the FAP to broadcast a "reserved" LAI. Some techniques involve a FAP removing the FAP's LAI from an authorized AT's forbidden list.

Implementations that employ access control techniques may have one or more of the following advantages. The likelihood of an authorized AT becoming blocked from its home FAP due to the home FAP's LAI being placed on the AT's forbidden list may be reduced. The frequency with which ATs that are not authorized on a particular FAP will reattempt to camp on the FAP may be reduced. This may limit or avoid excessive messaging traffic between the FAP and a core network with which the FAP communicates. Likewise, this may reduce or prevent excessive drain on the battery of the unauthorized AT. Potential obstacles to the ability of a core network to move an in-progress call between an authorized AT and a home FAP of the AT from the home FAP to a macrocell access point without incident may be removed. The ability of AT to make an emergency call using a FAP that the AT is not authorized to use may be retained.

As described above, ATs may be "authorized" or not authorized ("unauthorized") to use services of a FAP. The access control list for a particular FAP includes identities of ATs that are authorized on that FAP. ATs that are not identified on the access control list of a particular FAP are not authorized on that FAP. A particular AT may be authorized on one FAP and unauthorized on another FAP. From the perspective of a FAP, an AT is either an authorized access terminal (AAT) or an unauthorized access terminal (UAT). An authorized AT that has the LAI of its home FAP on its forbidden list is, from the perspective of the home FAP, an "authorized and blocked" access terminal. An authorized AT that does not have the LAI of its home FAP on the AT's forbidden list is, from the perspective of the home FAP, an "authorized and unblocked" access terminal.

A first set of closed access control techniques relate to a FAP changing its LAI. In a first example group of techniques within this first set, a foreign FAP is triggered to switch its LAI to a new LAI based upon receiving a Location Area Update Request message from an unauthorized AT that includes a LAI that the foreign FAP learns is identical to the unauthorized AT's home FAP. The foreign FAP may learn of this identity of LAIs by, e.g., checking a database. Prior to switching to the new LAI, the foreign FAP may also check a database to confirm that the new LAI is not on any of the forbidden lists of the foreign FAP's authorized ATs. In this way, the foreign FAP can reject the unauthorized AT using the new LAI so that the LAI of the unauthorized AT's home FAP never gets placed on the unauthorized AT's forbidden list.

In a second example group of techniques within the first set of closed access control techniques, a home FAP is triggered to switch its LAI to a new LAI based upon learning that an authorized AT of the home FAP includes the home FAP's original LAI on the authorized AT's forbidden list. The home FAP may learn of this forbidden list entry by, e.g., checking a database. Prior to switching to the new LAI, the home FAP may also check the same database to confirm that the new LAI is not on any of the forbidden lists of the home FAP's authorized ATs. In this way, the home FAP can broadcast the new LAI so that the authorized AT (that has the home FAP's original LAI on the authorized AT's forbidden list) can attempt to camp on and/or use the home FAP when the AT comes into the coverage area of the home FAP.

Figure 4:
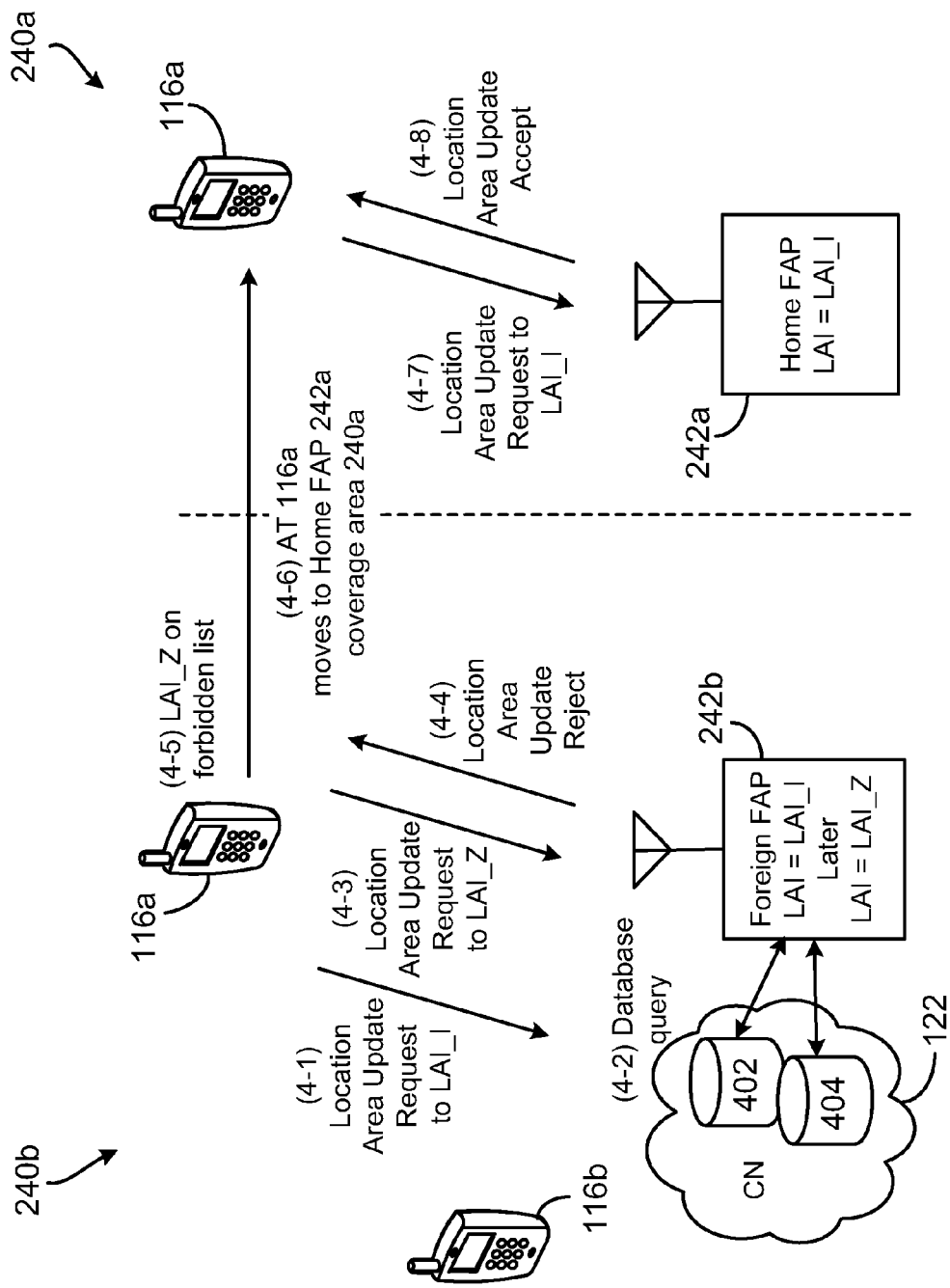
FIGS. 4-6 are diagrams illustrating a portion of the femtocell deployment of FIG. 2.

FIG. 4 is a diagram illustrating the AT 116a that ultimately moves (4-6) from the coverage area 240b of the FAP 242b (here a foreign FAP for the AT 116a) to the coverage area 240a of the FAP 242a (here a home FAP for the AT 116a). In FIG. 4, the FAP 242b implements techniques according to the first example group of techniques; thus, FIG. 4 shows a general case of the foreign FAP 242b switching to a different LAI ("LAI_Z") before rejecting a Location Area Update Request message from the AT 116a, which is not authorized on the foreign FAP 242b. The foreign FAP 242b starts out broadcasting an initial LAI ("LAI_I") for the FAP 242b. This LAI_I is the same as the LAI being broadcast by the home FAP 242a. The unauthorized AT 116a, which is in the coverage area 240b of the FAP 242b, sends (4-1) a Location Area Update Request message to the FAP 242b using LAI_I. When the FAP 242b receives the Location Area Update Request message from the AT 116a, the FAP 242b obtains the IMSI identifier of the AT 116 (if the IMSI was not already known to the FAP 242b) by sending an identity request message to the AT 116. The FAP 242b compares the IMSI with the access control list (ACL) 246b (see FIG. 2) stored on the FAP 242b and determines that the AT 116a is not authorized on the FAP 242b.

Instead of rejecting the AT 116a immediately, the FAP 242b queries (4-2) a first database 402 to obtain the LAI of the AT's 116a home FAP(s). In this case the home FAP 242a is the home FAP of the AT 116a. If the FAP 242b rejects the AT 116a without finding out the LAI of the AT's 116a home FAP 242a and that LAI turns out to match the LAI currently broadcast by the FAP 242b (LAI_I), then the FAP 242b could end up blocking the AT 116 on the AT's 116 home FAP 242a. In this example, the LAI of the home FAP 242a is also equal to LAI_I, so the foreign FAP 242b starts broadcasting the different LAI equal to LAI_Z. The foreign FAP 242b may use any procedure to select the new LAI, LAI_Z. The new LAI_Z may be randomly selected or chosen from a defined set of LAIs, for example.

There may be one or more criteria for the foreign FAP's 242b choosing LAI_Z. In an implementation, the foreign FAP 242b may query (4-2) a second database 404 to confirm that an initial choice for LAI_Z is not on the forbidden list of any of the foreign FAP's 242b authorized ATs (e.g., the forbidden list 118b of the AT 116b). This confirmation is made to try to ensure that switching to the initial choice of LAI_Z would not cause any authorized ATs of the foreign FAP 242b to be blocked from attempting to camp on the FAP 242b. The second database 404 may store "snapshots" or models of the forbidden lists of the foreign FAP's 242b authorized ATs. The second database of forbidden list models may include models for all authorized ATs on the femtocell network. Location Area Reject messages sent by FAPs to ATs may be tracked throughout the network to build the snapshots or models of the forbidden lists. Since the forbidden lists of the authorized ATs may have been cleared (e.g., by the ATs being turned off) since the forbidden list models were built, the forbidden list models represent worst-case forbidden lists for the authorized ATs. Thus, a forbidden list model corresponding to a particular AT may indicate several things. For example, the forbidden list model corresponding to a particular AT may indicate that any LAIs in the model were, at least recently, actually on the forbidden list of that AT. Likewise, the forbidden list model corresponding to a particular AT may indicate that any LAIs in the model are at least likely to actually be on the forbidden list of that AT. A femtocell network entity of femtocell network scope may be used in, e.g., the core network 122 to compile forbidden list model data for database(s). In other implementations, the foreign FAP 242b may not conduct a database query to confirm that a suitable LAI value has been selected.

In an implementation, the first database 402 and the second database 404 are stored remotely in the core network (CN) 122, but the first and second databases 402 and 404 may be stored remotely on the femtocell server 244 (not shown in FIG. 4) or locally on the FAP 242b itself. The first and second databases 402 and 404 may be stored on separate network entities or may be combined as part of a single database.

The AT 116a will hear the LAI_Z being broadcast by the foreign FAP 242b and will send (4-3) a Location Area Update Request message to the FAP 242b using LAI_Z. The foreign FAP 242b will then send (4-4) a Location Area Update Reject message to the AT 116a with a reject cause code of permanent effect, i.e., a cause code that will put (4-5) LAI_Z on the forbidden list 118a (see FIG. 2) of AT 116a. Thus, the AT 116a (until its forbidden list or the LAI entry in the list is cleared) will no longer try to camp on the foreign FAP 242b. The foreign FAP 242a may continue to broadcast the LAI_Z until the FAP 242b learns that the current broadcast LAI is identical to the LAI of a home FAP of an unauthorized AT that has sent a Location Area Update Request message to the foreign FAP 242a.

Later (e.g., 15 minutes, 2 hours, or a day later), when the AT 116a moves (4-6) into the coverage area 240a of its home FAP 242a, the AT 116a will hear the LAI_I being broadcast by the FAP 242a and will send (4-7) a Location Area Update Request message to the home FAP 242a using LAI_I. The home FAP 242a obtains the IMSI identifier of the AT 116a if the FAP 242a does not already know the IMSI, compares the IMSI with the FAP's 242a access control list (ACL) 246a (see FIG. 2), confirms that the AT 116a is authorized, and sends (4-8) a Location Area Update Accept message with the LAI_I to the AT 116a. Thus, the AT 116a successfully camps onto home FAP 242a.

Figure 5:
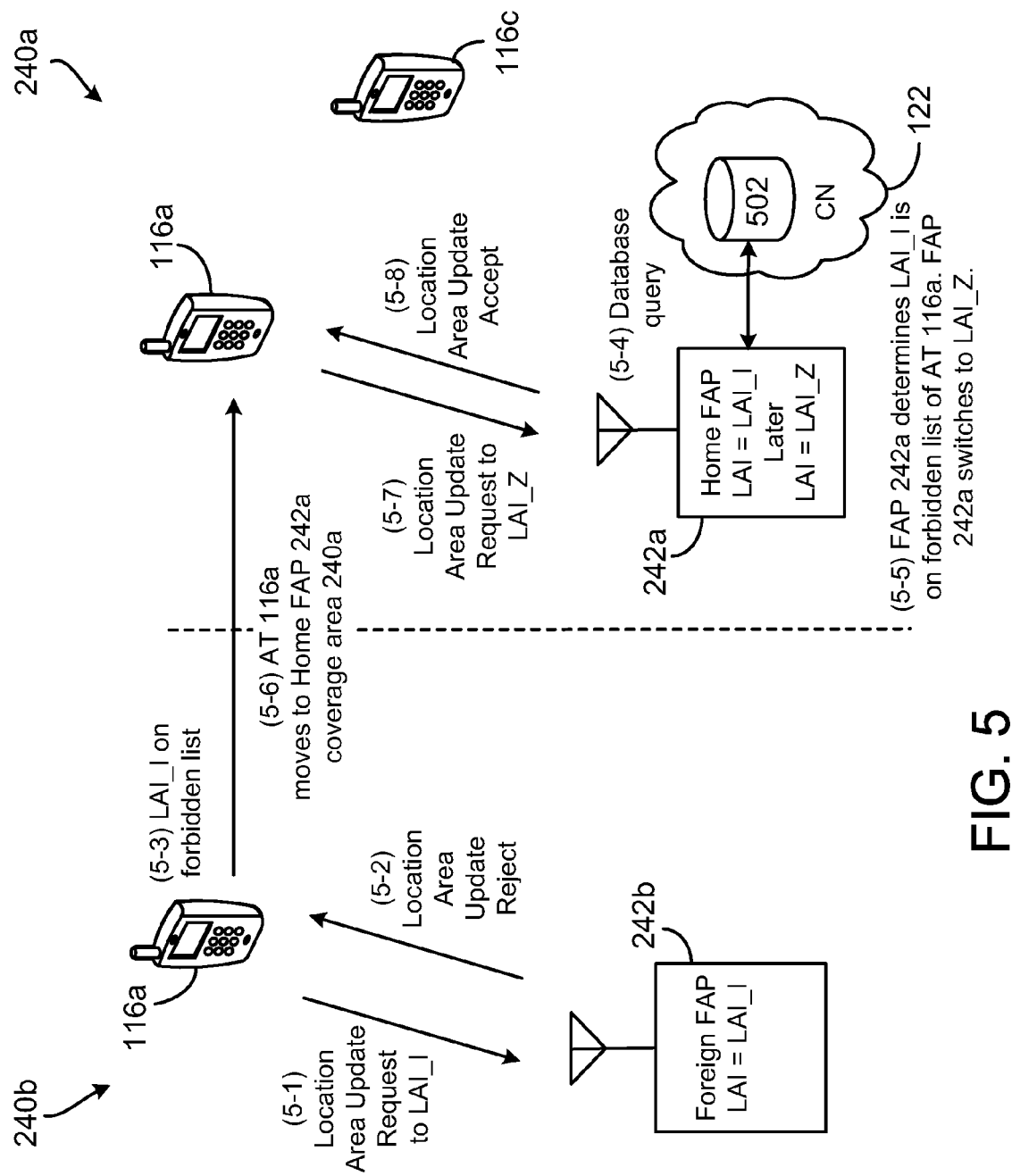

FIG. 5 is a diagram illustrating the AT 116a that ultimately moves (5-6) from the coverage area 240b of the foreign FAP 242b to the coverage area 240a of the home FAP 242c. In FIG. 5, the FAP 242a implements techniques according to the second example group of techniques; thus, FIG. 5 illustrates a general case of the home FAP 242a switching to a different LAI ("LAI_Z") to avoid using a LAI that is on the forbidden list of any of its authorized ATs, in this case the ATs 116a and 116c. The foreign FAP 242b starts out broadcasting an initial LAI ("LAI_I") for the FAP 242b. This LAI_I is the same as the LAI currently being broadcast by the home FAP 242a. The unauthorized AT 116a, which is in the coverage area 240b of the FAP 242b, sends (5-1) a Location Area Update Request message to the FAP 242b using LAI_I. After the FAP 242b receives the Location Area Update Request message from the AT 116a, the FAP 242b determines that the AT 116a is not authorized on the FAP 242b. The foreign FAP 242b will then send (5-2) a Location Area Update Reject message to the AT 116a with a reject cause code of permanent effect, i.e., a cause code that will put (5-3) LAI_I on the forbidden list 118a (see FIG. 2) of AT 116a. Thus, the AT 116a (until its forbidden list or the LAI entry in the list is cleared) will no longer try to camp on the foreign FAP 242b.

The home FAP 242a periodically queries (5-4) a database 502 to confirm that the LAI that the FAP 242a is currently broadcasting (LAI_I) is not on the forbidden list of any of the home FAP's 242a authorized ATs (e.g., the forbidden list 118c of the AT 116c and the forbidden list 118a of the AT 116a). This confirmation is to try to ensure that continuing to broadcast LAI_I would not cause any authorized ATs of the home FAP 242a to be blocked from attempting to camp on the FAP 242a. The database 502, similarly to the second database 404 of FIG. 4, may store "snapshots" or models of the forbidden lists of the home FAP's 242b authorized ATs. In an implementation, the core network (CN) 122 may notify (e.g., via the femtocell server 244) the home FAP 242a when one of its authorized ATs includes a forbidden list entry matching the LAI then being broadcast by the FAP 242a without, e.g., requiring the home FAP 242a to query a database.

In an implementation, the database 502 is stored remotely in the core network (CN) 122, but the databases 502 may be stored remotely on the femtocell server 244 (not shown in FIG. 5) or locally on the FAP 242a itself.

Since LAI_I has been placed (5-3) on the forbidden list 118a of the AT 116a, the home FAP 242a eventually determines (5-5) that the AT 116a is blocked from camping on the home FAP 242a, so the home FAP 242a starts broadcasting the different LAI equal to LAI_Z. The home FAP 242a may use any procedure to select the new LAI, LAI_Z. The new LAI_Z may be randomly selected or chosen from a defined set of LAIs, for example.

There may be one or more criteria for the home FAP's 242a choosing LAI_Z. In an implementation, the home FAP 242a may query (5-4) the database 502 to confirm that an initial choice for LAI_Z is not on the forbidden list of any of the home FAP's 242a authorized ATs (e.g., the forbidden list 118b of the AT 116b). This confirmation is made to try to ensure that switching to the initial choice of LAI_Z would not cause any authorized ATs of the home FAP 242a to be blocked from attempting to camp on the FAP 242a. As mentioned above, the database 502 may store "snapshots" or models of the forbidden lists of the home FAP's 242a authorized ATs. In other implementations, the home FAP 242a may not conduct a database query to confirm that a suitable LAI value has been selected.

Later, when the AT 116a moves (5-6) into the coverage area 240a of its home FAP 242a, the AT 116a will hear the LAI_Z being broadcast by the home FAP 242a and will send (5-7) a Location Area Update Request message to the FAP 242a using LAI_Z. Once the home FAP 242a confirms that the AT 116a is authorized, the home FAP 242a will then send (5-8) a Location Area Update Accept message with the LAI_I to the AT 116a. Thus, the AT 116a successfully camps onto home FAP 242a. The home FAP 242a may continue to broadcast the LAI_Z until the FAP 242a learns that the current broadcast LAI is on the forbidden list of any of the home FAP's 242a authorized ATs.

In an implementation, the home FAP 242a may not consult a database 502 to determine whether any of the FAP's 242a authorized ATs are blocked, but may instead run an experiment to determine whether the current broadcast LAI (LAI_I) is on the forbidden list of any of its authorized ATs. The home FAP 242a may, periodically, "blindly" switch to broadcasting another LAI ("LAI_Y"), and then wait to see whether any of its authorized ATs suddenly attempt to camp of the FAP 242a by sending a Location Area Update Request message using LAI_Y If the home FAP 242a does not receive a near immediate camp on request from an authorized AT, the home FAP 242a may return to broadcasting LAI_I. If the home FAP 242a does suddenly receive a Location Area Update Request message from an authorized AT, the home FAP 242a may continue broadcasting LAI_Y, with or without checking whether LAI_Y is on any of the FAP's 242a ATs forbidden lists.

In an implementation, the home FAP 242a may also run an experiment to determine whether the current broadcast LAI (LAI_I) is on the forbidden list of any of its authorized ATs by switching to a "reserved" LAI ("LAI_R"), that is effectively guaranteed by design not to be included on (or placed on) the forbidden list of any AT. The FAP 242a may broadcast the reserved LAI (LAI_R) and then wait to see whether any of its authorized ATs suddenly attempt to camp of the FAP 242a by sending a Location Area Update Request message using LAI_R. If the home FAP 242a does not receive a near immediate camp on request from an authorized AT, the home FAP 242a may return to broadcasting LAI_I. If the home FAP 242a does suddenly receive a Location Area Update Request message from an authorized AT, the home FAP 242a may switch to broadcasting another LAI (LAI_Y) and continue broadcasting LAI_Y, with or without checking whether LAI_Y is on any of the FAP's 242a ATs' forbidden lists. The home FAP 242a cannot continue broadcasting the reserved LAI (LAI_R) indefinitely because unauthorized ATs may potentially bombard the home FAP 242a with repeated camp on requests (since the reserved LAI is not any AT's forbidden list).

Figure 6:
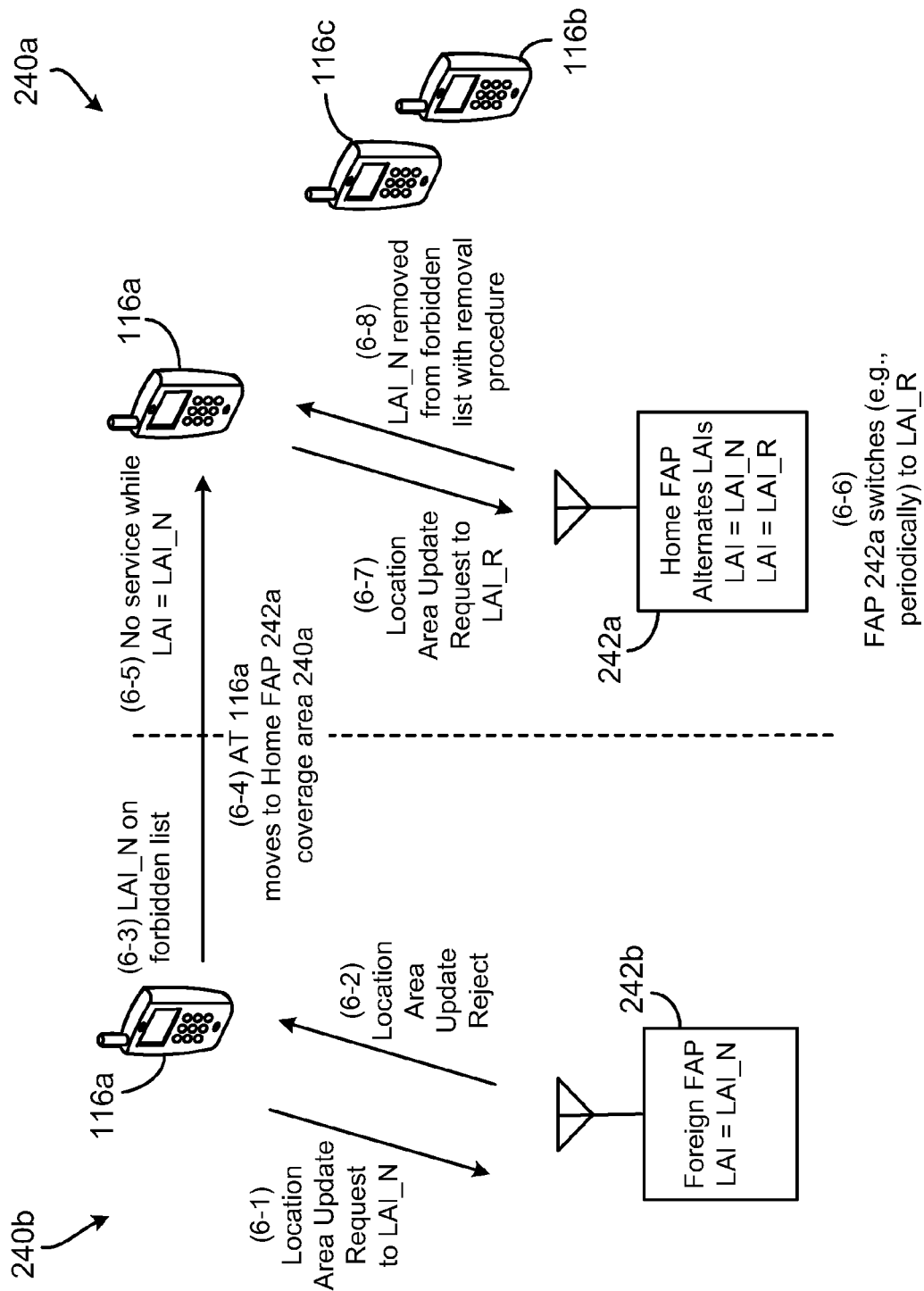

FIG. 6 is a diagram illustrating the AT 116a that ultimately moves (6-4) from the coverage area 240b of the foreign FAP 242b to the coverage area 240a of the home FAP 242c. FIG. 6 illustrates a general case of the home FAP 242a temporarily broadcasting a different, "reserved" LAI (here "LAI_R") to try to reestablish communication with any authorized AT that has the regularly broadcast, "normal" LAI ("LAI_N") on its forbidden list. A forbidden list removal procedure is used to remove the normal LAI (LAI_N) from an authorized AT's forbidden list. As in FIG. 5, the foreign FAP 242b rejects the AT 116a by sending (6-2) a Location Area Update Reject message to the AT 116a with a reject cause code of permanent effect, i.e., a cause code that will put (6-3) LAI_N on the forbidden list 118a (see FIG. 2) of AT 116a. When the AT 116a moves (6-4) into the coverage area 240a of the home FAP 242a, then because LAI_N is on the forbidden list of the AT 116a, the AT 116a will not attempt to camp onto home FAP 403 and will receive no service (6-5) while the home FAP 242a broadcasts the normal LAI (LAI_N). After some period of time, the home FAP 242a will switch (6-6) to broadcasting the reserved LAI (LAI_R) for a limited duration. Example time values are discussed in more detail below. LAI_R is a reserved LAI that is effectively guaranteed by design not to be included on (or placed on) the forbidden list of any AT. In an implementation, LAI_R is never placed on the forbidden list of any AT because the LAI_R is never included in any Location Area Update Reject message from any femtocell or macrocell access point. LAI_R may be a known LAI that is not used to identify any femtocell or macrocell with the core network. Upon hearing the broadcast LAI_R from the home FAP 242a, the AT 116a will issue (6-7) a Location Area Update Request message using the LAI_R to the FAP 242a. Once the FAP 242a determines that the AT 116a is authorized on the FAP 242a, the FAP 242a will then perform (6-8) the forbidden list removal procedure, after which LAI_N will no longer be on the forbidden list of the AT 116a. The forbidden list removal and unblocking of the authorized AT is accomplished by returning a Location Area Update Accept message using the LAI_N to the authorized AT, here AT 116a, in response to the Location Area Update Request message from the AT 116a that included LAI_R. This forbidden list removal and unblocking is described in more detail below. The description of the use of the Location Area Update Accept message in removing a forbidden list entry may be found in 3GPP Technical Specification 24.008, section 4.4.4.6. The unblocked AT 116a sends another Location Area Update Request message using LAI R to the FAP 242a, and this time the FAP 242a responds with a Location Area Update Accept message using LAI_R and the AT 116a is able to successfully camp onto the FAP 242a. Eventually the home FAP 242a goes back to broadcasting the normal LAI (LAI_N). The authorized AT 116a is no longer blocked, so the AT 116a will send a Location Area Update Request message using LAI_N to the home FAP 242a, and the AT 116a will successfully camp onto the FAP 242a.

In general, a second group of closed access control techniques, such as those generally shown in FIG. 6 and described in more detail with reference to FIG. 7 and subsequent FIGS. 8-11, may be implemented without resort to a database or other means by which the FAP can learn the content of the forbidden lists of its authorized AT's. That is, the techniques shown in, e.g., FIG. 6 and subsequent FIGS. 7-11 do not require knowledge of, or access to information regarding, AT forbidden lists by the FAP, although such knowledge or information may be used by the FAP in certain implementations.

Figure 7:
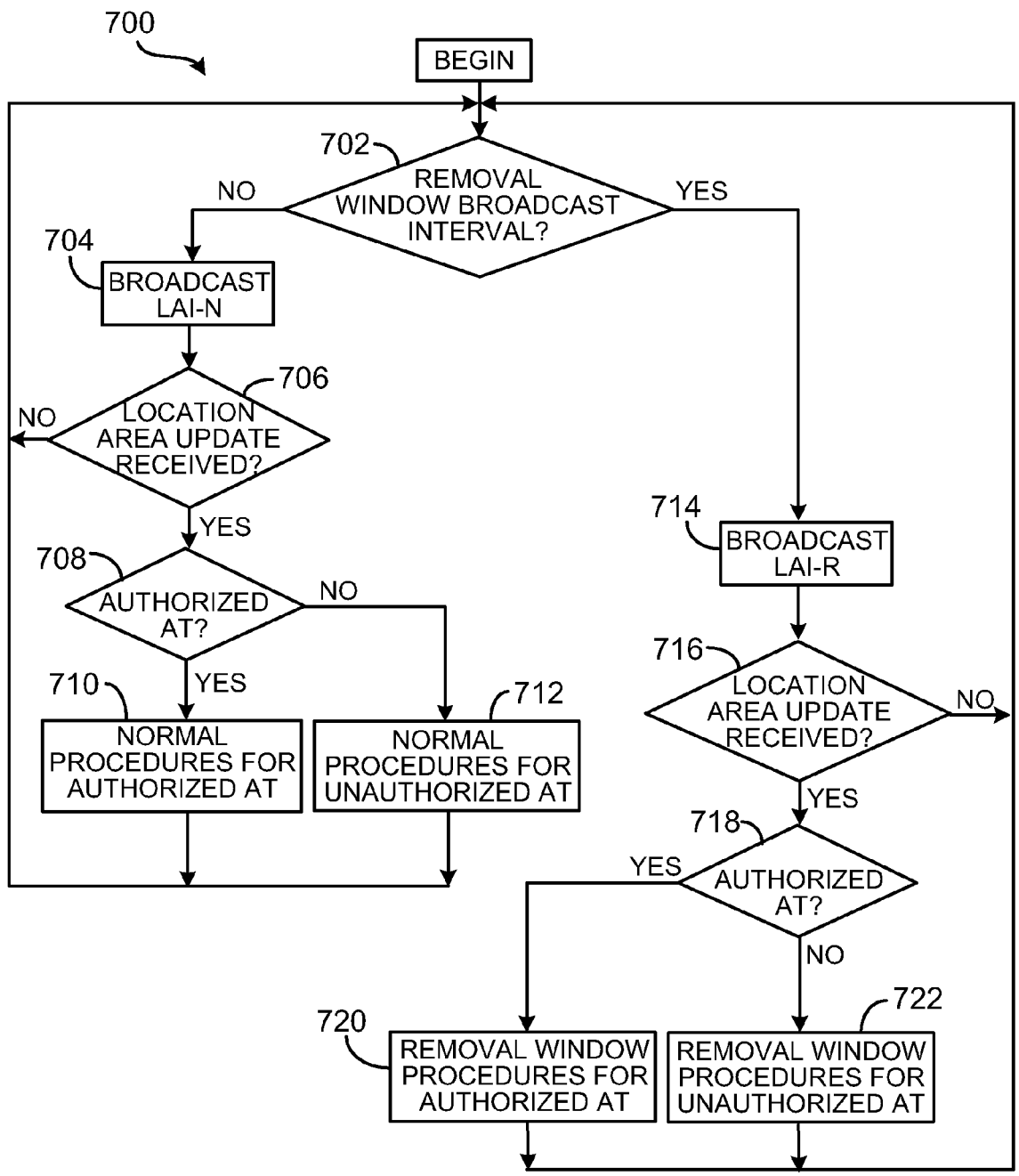
FIG. 7 is a flow diagram of an example process for closed access control.

FIG. 7 illustrates an example process 700 for closed access control that may be implemented on the FAP 242a (and the FAP 242b) shown in FIG. 6. According to the process 700, a FAP works in LAI "Alternation mode", that is, sometimes the FAP broadcasts a normal LAI (LAI_N) and sometimes the FAP 242a broadcasts a reserved LAI, LAI_R. In an implementation, when all authorized ATs for a particular FAP have camped on the FAP, the FAP may stop broadcasting the reserved LAI_R and may just broadcast the LAI_N until, e.g., such time as fewer than all authorized ATs are camped on the FAP. Note that different FAPs may and very often will have different values of the LAI for the normal LAI (referred to generically as LAI_N), but all FAPs in a femtocell deployment may use the same reserved LAI. Multiple reserved LAIs may be used by a single FAP or within one or more femtocell deployments. The timing of broadcasting a reserved LAI may be periodically or randomly triggered, or event triggered. For example, the FAP may be configured to broadcast the reserved LAI for X seconds every Y minutes. X and Y may be constant (for the case of periodic broadcasting of the reserved LAI) or may each randomly vary (for random broadcasting). X may be on the order of, e.g., 10 seconds, while Y may be on the order of, e.g., 5 minutes. In an example of random broadcasting, the reserved LAI may be broadcast for 10 seconds, then the normal LAI may be broadcast for 5 minutes, then the reserved LAI may be broadcast for 11 seconds, then the normal LAI may be broadcast for 4.8 minutes, and so on. An example of an event triggered broadcast of the reserved LAI might include the FAP querying a forbidden list model database such as the second database 404 of FIG. 4 or the database 502 of FIG. 5.

In general, a design trade-off may present itself when deciding how long to broadcast the reserved LAI, LAI_R, versus how long to broadcast the normal LAI, LAI_N. When the FAP switches to broadcasting the reserved LAI, since the reserved LAI is on no AT's forbidden list, any nearby unauthorized ATs can try to camp on the FAP. For this reason, the reserved LAI should be broadcast for as short a time as possible. On the other hand, the longer that the FAP broadcasts the normal LAI, the longer that, e.g., a home user using an authorized but blocked AT may have to wait before be able to use the user's home FAP. Thus, it may be helpful to not broadcast the normal LAI for too long a period. Designers may trade off one competing concern for the other.

The duration of the reserved LAI broadcast (X seconds in duration) may be referred to as a removal window broadcast interval. In the example process 700 of FIG. 7, the FAP 242a determines (702) whether the FAP 242a is presently operating in the removal window broadcast interval. The FAP 242a may check a timer to see if the FAP 242a is within the window. If the FAP 242a is within the window, the FAP 242a broadcasts (714) the reserved LAI, LAI_R. Otherwise, the FAP 242a broadcasts (704) the normal LAI, LAI_N. In either case, normal LAI or reserved LAI, if a Location Area Update Request message is received (706, 716), then the FAP 242a determines (708, 718) whether the AT is authorized on the FAP 242a. Processing of the Location Area Update Request message by the FAP 242a depends on whether or not the FAP 242a is in the reserved LAI broadcast interval (the removal window broadcast interval) and on whether or not the AT that sent the Location Area Update Request message is authorized to use the FAP 242a.

Over the femtocell network as a whole, those LAIs that are assigned to the femtocell network may be divided and partitioned into two pools of LAIs: normal LAIs and reserved LAIs. A normal LAI (LAI_N) is the LAI normally assigned to a FAP and that the FAP regularly broadcasts when the FAP is not broadcasting the reserved LAI. It is permissible for a FAP to add a normal LAI to an AT's forbidden list. A reserved LAI, as explained above, is different from any normal LAIs in the femtocell network. The reserved LAI may be used to attract an authorized and blocked AT to the home FAP so that the home FAP can remove the home FAP's normal LAI from the AT's forbidden list, thus serving to "unblock" the authorized AT so that the AT may successfully camp on and use the home FAP. It is not permitted for a reserved LAI to be put on any AT's forbidden list; thus no FAP or other access point may send Location Area Update Reject messages using the LAI_R with a reject cause code of permanent effect to an unauthorized AT. Any number of unique normal LAIs may be used in a femtocell network, generally up to the numerical limit of a UMTS network (assuming no translation of FAP LAIs). As described above, however, there are several reasons why an operator may want to reduce the number of unique LAIs assigned to FAPs within a femtocell network. In an implementation, the number of unique normal LAIs in a femtocell network may be on the order of 10 (although any number may be used), while the number of unique reserved LAIs may be greater than or equal to one.

As described above, an unauthorized AT is an AT that is not allowed to use a foreign FAP. An authorized AT is an AT that is allowed to get access to and use the AT's home FAP. An authorized and unblocked AT is an AT that has not added the LAI of the AT's home FAP to the AT's forbidden list. An authorized but blocked AT is an AT that has added the LAI of the AT's home FAP to the AT's forbidden list, so the AT is prevented from camping on and using the AT's home FAP.

Referring again to FIG. 7, during the period when the FAP 242a broadcasts (704) a normal LAI (i.e., outside the removal window broadcast interval), if the FAP 242a receives a Location Area Update Request message from an AT, the FAP 242a determines (708) whether the AT is an authorized AT. If the AT is an authorized AT (e.g., AT 116a), the FAP 242a executes (710) its normal handling procedure for an authorized AT. The procedure is shown as part of FIG. 8. If the AT is an unauthorized AT (e.g., AT 116b of FIGS. 2 and 6), the FAP 242a executes (712) its normal handling procedure for an unauthorized AT. This procedure is shown as part of FIG. 9.

During the period when the FAP 242a broadcasts (714) a reserved LAI (i.e., within the removal window broadcast interval), if the FAP 242a receives a Location Area Update Request message from an AT, the FAP 242a determines (718) whether the AT is an authorized AT. If the AT is an authorized AT (e.g., AT 116a), the FAP 242a executes the removal window handling procedure for an authorized AT. The procedure is shown as part of FIG. 10. If the AT is an unauthorized AT (e.g., AT 116b of FIGS. 2 and 6), the FAP 242a executes the removal window handling procedure for an unauthorized AT. This procedure is shown as part of FIG. 11.

When the FAP 242a broadcasts a normal LAI (LAI_N), an authorized AT is attracted to FAP 242a (a home FAP for the authorized AT); whereas an unauthorized AT is rejected by FAP 242a (a foreign FAP for the unauthorized AT). A normal LAI may be put into an AT's forbidden list; whereas a reserved LAI (LAI_R) can never be put into an AT's forbidden list. When the FAP 242a broadcasts a reserved LAI, an authorized AT is attracted to the FAP 242a (a home FAP for the authorized AT); an authorized but blocked AT is triggered to remove the FAP's 242a normal LAI from the authorized AT's forbidden list and then afterwards is attracted to the FAP 242a (a home FAP for the authorized and formerly blocked AT); and an unauthorized AT is redirected to the macrocell access point 108 by the FAP 242a (a foreign FAP for the unauthorized AT). During the removal window broadcast interval the FAP 242a does not reject an unauthorized AT using a Location Area Update Reject message including the reserved LAI with a reject cause code of permanent-effect such as UMTS codes #13 and UMTS codes #15 [see 3GPP Technical Specification 24.008 section 4.4.4.7]; therefore, the reserved LAI is never added to any AT's forbidden list.

FIGS. 8-11 illustrate communication and example handling procedures for the example process 700 for closed access control (see FIG. 7) that may be implemented on the FAP 242a (and the FAP 242b) shown in FIG. 6.

Figure 8:
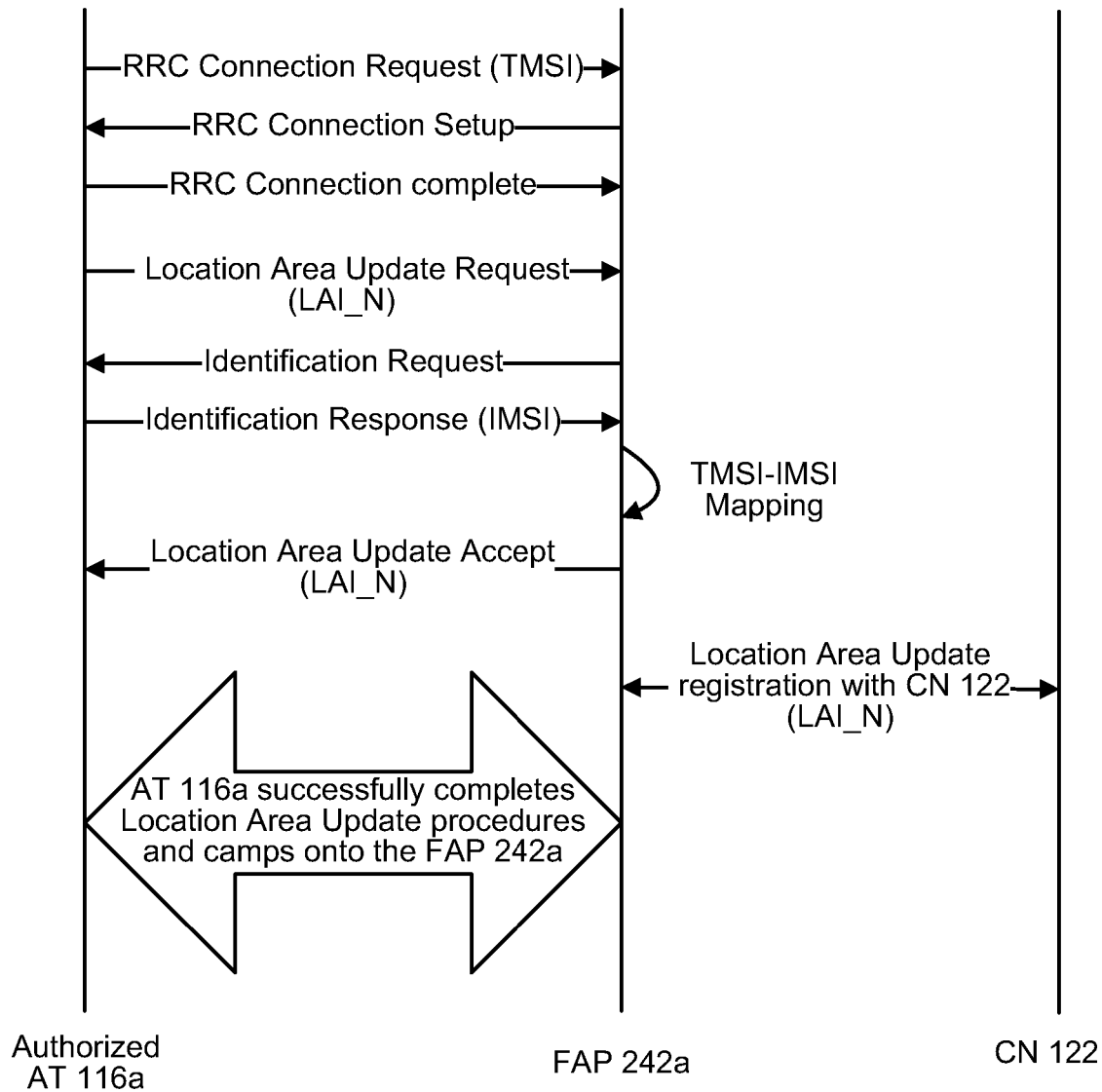
FIGS. 8-11 are diagrams illustrating message traffic and activity between access terminals and femtocells.

FIG. 8 is a diagram illustrating message traffic and activity between an authorized AT (e.g., AT 116a) and a FAP (e.g., FAP 242a), including an example implementation of a FAP 242a normal handling procedure for the authorized AT (see (710) in FIG. 7). The procedure is performed while the FAP 242a is broadcasting the normal LAI, LAI_N.

Assume the authorized AT 116a is camped on the macrocell access point 108. The AT 116a may perform system selection on the macrocell 108 by listening to a neighbor list being broadcast by the macrocell 108. The macrocell 108 neighbor list includes the Scrambling Code of the FAP 242a. When the authorized AT 116a is listening for the FAP 242a and within range of the FAP 242a, the authorized AT 116a hears the LAI being broadcast by the FAP 242a (in this case, the normal LAI, LAI_N). Since the FAP's 242a LAI_N is different from the LAI of the macrocell 108, the authorized AT 116a is triggered to initiate a Location Area Update procedure with the FAP 242a. In order to do the Location Area Update procedure, the authorized AT 116a initiates a Radio Resource Control (RRC) connection by sending a RRC Connection Request with the AT's 116a TMSI AT identifier to the FAP 242a. The RRC is a protocol that ATs use in UMTS to communicate with an access point. The FAP 242a continues RRC Connection Setup with the AT 116a and the RRC connection is complete.

Next, the authorized AT 116a sends a Location Area Update Request message using the LAI_N to the FAP 242a. As described above, the FAP 242a stores an access control list that may include a list of International Mobile Subscriber Identity (IMSI) identifiers of all of the FAP's 242a authorized ATs. If the authorized AT 116a only includes a Temporary Mobile Subscriber Identity (TMSI) identifier in the Location Area Update Request message, then the FAP 242a sends an identification request to request that the AT 116a return its IMSI to the FAP 242a. Upon the reception of an identification response from the AT 116a with the IMSI, the FAP 242a compares the AT's 116a IMSI with the FAP's 242a access control list to determine whether the AT 116a is authorized. The FAP 242a thus confirms that the AT 116a is authorized and the FAP 242a builds up the FAP's 242a IMSI-TMSI mapping for that AT 116a for future use by the FAP 242a. From prior communications with the AT 116a, the FAP 242a may already know the AT's 116a IMSI and TMSI and may have this information mapped, so the FAP 242a may not need to perform an AT identity request procedure.

To this point, the procedure is similar for an unauthorized AT (e.g., 116b of FIGS. 2 and 6), except that the FAP 242a determines that the AT 116b is not authorized through the FAP's 242a check of the FAP's 242a access control list. See, e.g., FIG. 9.

Referring again to FIG. 8, when the FAP 242a confirms that the AT 116a is authorized, the FAP 242a returns a Location Area Update Accept message using the FAP's 242a normal LAI (LAI_N) to the authorized AT 116a.

Next, the AT 116a successfully completes the Location Area Update procedure with the FAP 242a and camps onto the FAP 242a for normal service.

A FAP such as the FAP 242a in a femtocell deployment may generally complete the Location Area Update procedure with an AT. A typical macrocell access point may not be configured to perform a Location Area Update procedure with an AT. Rather, the core network may generally perform the procedure with the AT with the macrocell forwarding messages back and forth. In a femtocell deployment, a FAP may generally be configured to perform the Location Area Update procedure with the AT and, for those ATs that are authorized on the FAP, the FAP may exchange certain messages (e.g., Location Area Update messages) with the core network to register the AT with the core network so that from the perspective of the core network it may be as if the core network is communicating with the AT directly. In an implementation, the FAP may regenerate Location Area Update messages, or replay ones that the FAP 242a previously received, and send the messages to the core network to register the AT. Thus, referring to FIG. 8, the FAP 242a performs Location Area Update registration of the AT 116a with the core network 122.

Figure 9:
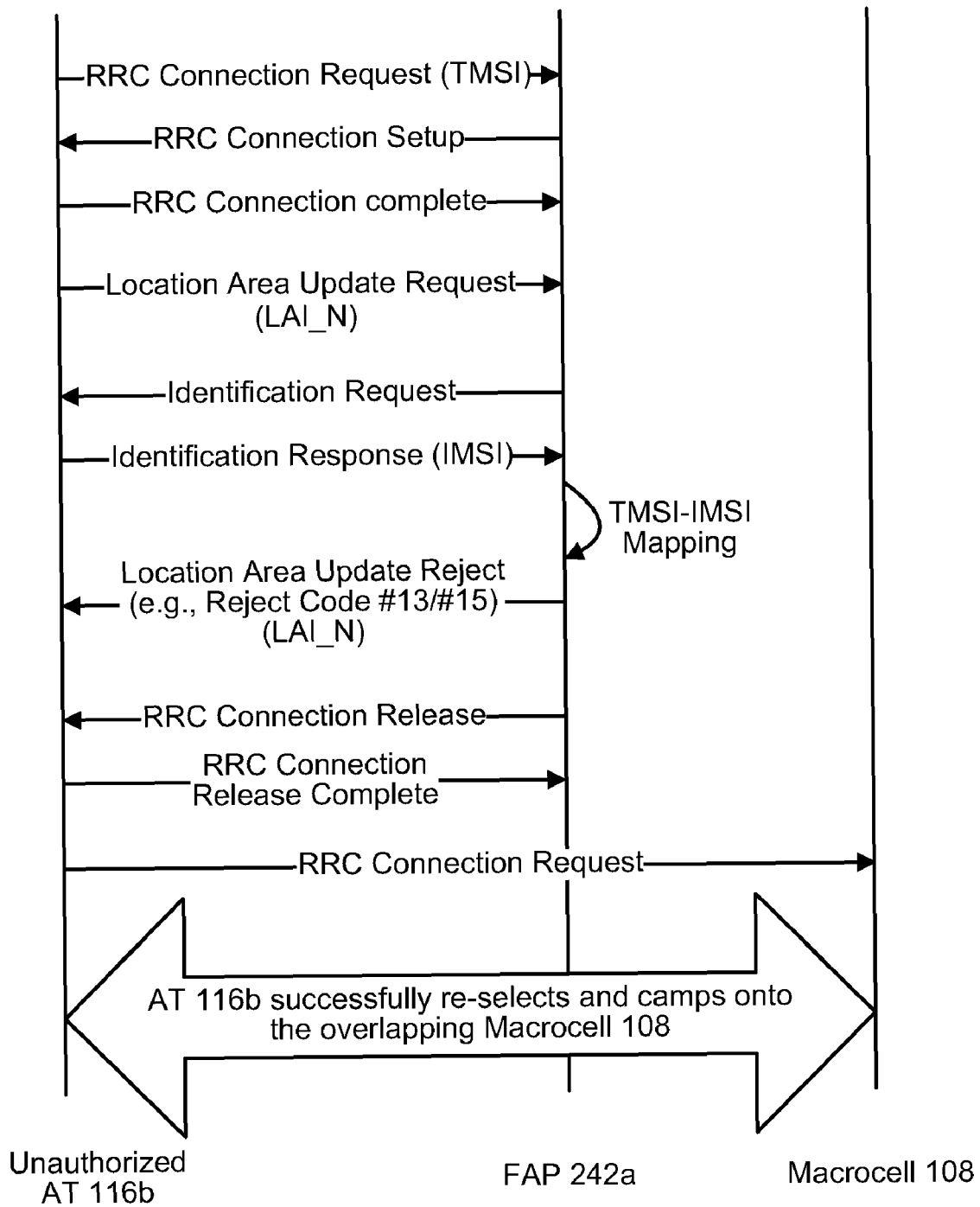

FIG. 9 is a diagram illustrating message traffic and activity between an unauthorized AT (e.g., AT 116b of FIGS. 2 and 6) and a FAP (e.g., FAP 242a), including an example implementation of a FAP 242a normal handling procedure for the unauthorized AT (see (712) in FIG. 7). The procedure is performed while the FAP 242a is broadcasting the normal LAI, LAI_N.

In similar fashion to that described above with respect to FIG. 8, an unauthorized AT 116b may perform system selection on the macrocell 108 and may ultimately hear the LAI being broadcast by the FAP 242a (in this case, the normal LAI, LAI_N). The unauthorized AT 116b initiates a Location Area Update procedure with the FAP 242a, and an RRC Connection is setup and completed ("RRC Connection complete") between the AT 116b and the FAP 242a, as described above. The unauthorized AT 116b next sends a Location Area Update Request message using LAI_N to the FAP 242a. The FAP 242a, e.g., then obtains the AT's 116b IMSI and compares the IMSI with the FAP's 242a access control list, confirms that the AT 116b is not authorized, and builds up the FAP's 242a IMSI-TMSI mapping for that AT 116b for future use.

When the FAP 242a confirms that the AT 116b is not authorized, the FAP 242a rejects the AT 116b. The FAP 242a may return a Location Area Update Reject message using the FAP's 242a normal LAI (LAI_N) with a reject cause code of permanent effect to the unauthorized AT 116b. A reject cause code of permanent effect sent to an AT places the LAI enclosed in the Location Area Update Reject message in the forbidden list of the AT. Here, the FAP 242 LAI_N is placed on the forbidden list of the unauthorized AT 116b. Examples of reject cause codes of permanent effect include the UMTS codes #13 ("Roaming not allowed in this location area") and #15 ("No Suitable Cells in Location Area"). See, e.g., 3GPP Technical Specification 24.008, section 4.4.4.7 for more detail. Both codes #13 and #15 cause the LAI to be stored in an AT's forbidden list. Other codes or commands that place a LAI (or multiple LAIs) in an AT's forbidden list may be used.

Using a reject cause code that places a FAP's normal LAI on an unauthorized AT's forbidden list avoids (at least until the entry for the normal LAI in the forbidden list or the entire forbidden list is cleared) a situation in which the unauthorized AT gets rejected but continues to try to camp on the FAP (a foreign FAP from the unauthorized AT's perspective) whenever the AT hears the FAP broadcast its normal LAI.

The RRC Connection between the FAP 242a and the unauthorized AT 116b is released (see "RRC Connection Release" and "RRC Connection Release Complete" in FIG. 9. Upon receiving the Location Area Update Reject message with LAI_N from the FAP 242a, the unauthorized AT 116b adds the FAP's 242a normal LAI (LAI_N) to the AT's 116b forbidden list. While LAI_N is on the forbidden list, the unauthorized AT 116b will not attempt to reach the FAP 242a when the FAP 242a is broadcasting its normal LAI (LAI_N). The unauthorized AT automatically tries system selection with the macrocell access point 108, and may generally reselect and camp onto the macrocell 108 (FAP 242a is in the service area 102 of macrocell 108).

Figure 10:
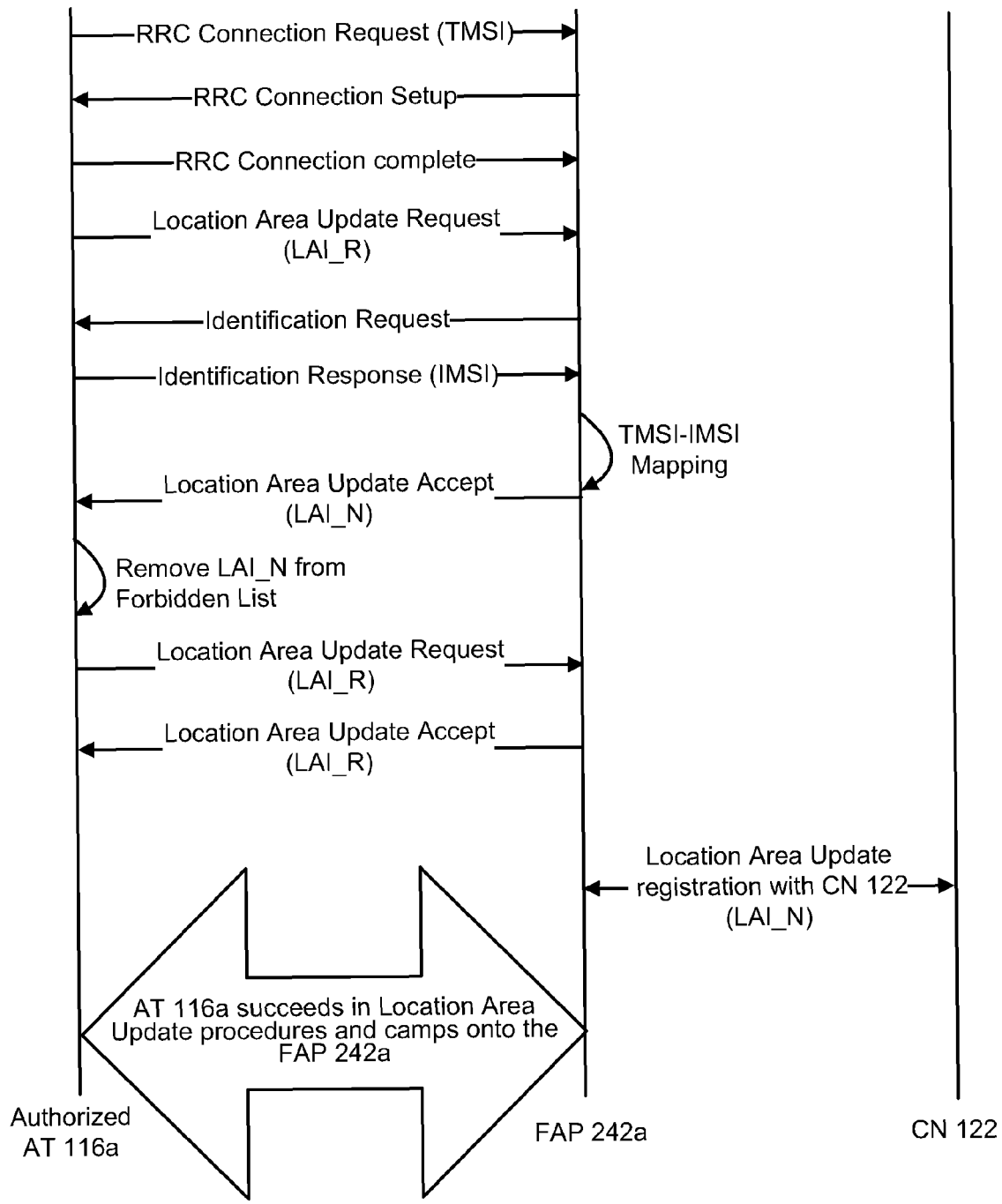

FIG. 10 is a diagram illustrating message traffic and activity between an authorized AT (e.g., AT 116a) and a FAP (e.g., FAP 242a), including an example implementation of a FAP 242a removal window handling procedure for the authorized AT (see (720) in FIG. 7). The procedure is performed while the FAP 242a is broadcasting the reserved LAI, LAI_R.

In similar fashion to that described above with respect to FIG. 8, the authorized AT 116a may perform system selection on the macrocell 108 and may ultimately hear the LAI being broadcast by the FAP 242a. Here, the FAP 242a is within the removal window broadcast interval and is broadcasting LAI_R (see FIG. 7 at (702), (714)). As described above, LAI_R is a reserved LAI that is effectively guaranteed by design not to be included on (or placed on) the forbidden list of any AT. Thus, even an authorized AT that has the FAP's 242a normal LAI on the AT's forbidden list will generally respond to the broadcast of LAI_R by the FAP 242a. The authorized AT 116a initiates a Location Area Update procedure with the FAP 242a, and an RRC Connection is setup and completed ("RRC Connection complete") between the AT 116a and the FAP 242a, as described above. The authorized AT 116a next sends a Location Area Update Request message using LAI_R to the FAP 242a. The FAP 242a, e.g., then obtains the AT's 116a IMSI and compares the IMSI with the FAP's 242a access control list, confirms that the AT 116a is authorized, and builds up the FAP's 242a IMSI-TMSI mapping for that AT 116a for future use.

When the FAP 242a confirms that the AT 116a is authorized, then, instead of responding to the AT 116a with Location Area Update Accept message that uses LAI_R, which the FAP 242a is currently broadcasting, the FAP 242a returns a Location Area Update Accept message using LAI_N, the FAP's 242a normal LAI that the FAP 242a is not currently broadcasting. The FAP 242a does this in order to perform the forbidden list removal procedure and clear the FAP's 242a normal LAI from the forbidden list of the authorized AT 116a. The description of the use of the Location Area Update Accept message in removing a forbidden list entry may be found in 3GPP Technical Specification 24.008, section 4.4.4.6: "If the LAI or PLMN identity contained in the LOCATION UPDATING ACCEPT message is a member of the list of 'forbidden location areas for regional provision of service', the list of 'forbidden location areas for roaming' or the 'forbidden PLMN list' then such entries shall be deleted."

Thus, the FAP 242a responds to a Location Area Update Request message using LAI_R (received from the AT 116a) by sending a Location Area Update Accept message using LAI_N to the AT 116a. An authorized but blocked AT is triggered to remove LAI_N from the AT's forbidden list. An authorized and unblocked AT does not have LAI_N on its forbidden list, so the AT has no specific action to perform in response to the Location Area Update Accept message from the FAP 242a. Thus, the removal window handling procedure for authorized ATs does not differentiate between blocked and unblocked ATs. Thus, in some implementations, the FAP 242a may employ closed access control techniques without knowledge of whether a particular authorized AT is blocked (e.g., has the FAP's 242a normal LAI in its forbidden list) or is unblocked.

Upon receipt of the Location Area Update Accept message with LAI_N from the FAP 242a, the authorized (now unblocked, or still unblocked) AT 116a detects that normal LAI (LAI_N) is different from the reserved LAI (LAI_R) being currently broadcast by the FAP 242a. The FAP's 242a response to the AT's 116a earlier Location Area Update Request message with LAI_R does not satisfy the AT 116a, so the AT 116a sends another Location Area Update Request message using LAI_R to the FAP 242a.

This time, the FAP 242a returns a Location Area Update Accept message with the reserved LAI (LAI_R) enclosed to the authorized AT 116a.

Next, the authorized AT 116a successfully completes the Location Area Update procedure with the FAP 242a and camps onto the FAP 242a. Note that communications between the authorized AT 116a and the FAP 242a will use the reserved LAI (LAI_R) rather than the normal LAI (LAI_N).

As described above, in a femtocell deployment, a FAP may generally be configured to perform the Location Area Update procedure with the AT and, for those ATs that are authorized on the FAP, the FAP may exchange certain messages (e.g., Location Area Update messages) to the core network to register the AT with the core network so that from the perspective of the core network it may be as if the core network is communicating with the AT directly. Referring to FIG. 10, in the removal window handling procedure for authorized ATs, the FAP 242a is communicating with an authorized AT 116a using the FAP's 242a reserved LAI (LAI_R). In performing Location Area Update registration of the AT 116a with the core network, however, the FAP 242a may use the FAP's 242a normal LAI (LAI_N). This, the FAP 242a, acting on behalf of the authorized AT 116a, sends a Location Area Update message with LAI_N to the core network 122. This message causes the core network 122 to register the location of the authorized AT 116a as LAI_N. Thus, the FAP 242a shields its reserved LAI (LAI_R) from the core network 122 and the FAP 242a translates between the normal LAI (LAI_N) and the reserved LAI (LAI_R) in communications with the core network 122. Thus, from the perspective of the core network 122, the authorized AT 116a is located in LAI_N, not LAI_R. Registering the location of the authorized AT 116a as LAI_N with the core network 122 allows the core network 122 to interface properly with the FAP 242a, avoids any potential issues that would arise from the FAP's 242a alternating LAIs in communications with the core network 122 itself (which may not be practicable in any event).

In a variation (not shown in FIG. 10) of the removal window handling procedure for authorized ATs, rather than send a Location Area Update Accept message with LAI_R after unblocking the authorized AT 116a, the FAP 242a sends a Location Area Update Reject message with reject cause codes (e.g., UMTS cause codes #48 or #111). These codes are explained in more detail below. For UMTS reject cause code #111, see 3GPP Technical Specification 24.008 section 4.4.4.9 and Technical Specification 25.304 section 5.2.2.4. For UMTS reject cause code #48, see 3GPP Technical Specification 24.008 sections 4.4.4.9 and 4.2.2.2. The now unblocked authorized AT 116a will use system selection and eventually hear the FAP 242a again when the FAP 242 is broadcasting its normal LAI (LAI_N). Since the AT 116a is now unblocked, the authorized AT 116a successfully completes the Location Area Update procedure with the FAP 242a and camps onto the FAP 242a. Note that communications between the authorized AT 116a and the FAP 242a will use LAI_N rather than the reserved LAI (LAI_R).

Figure 11:
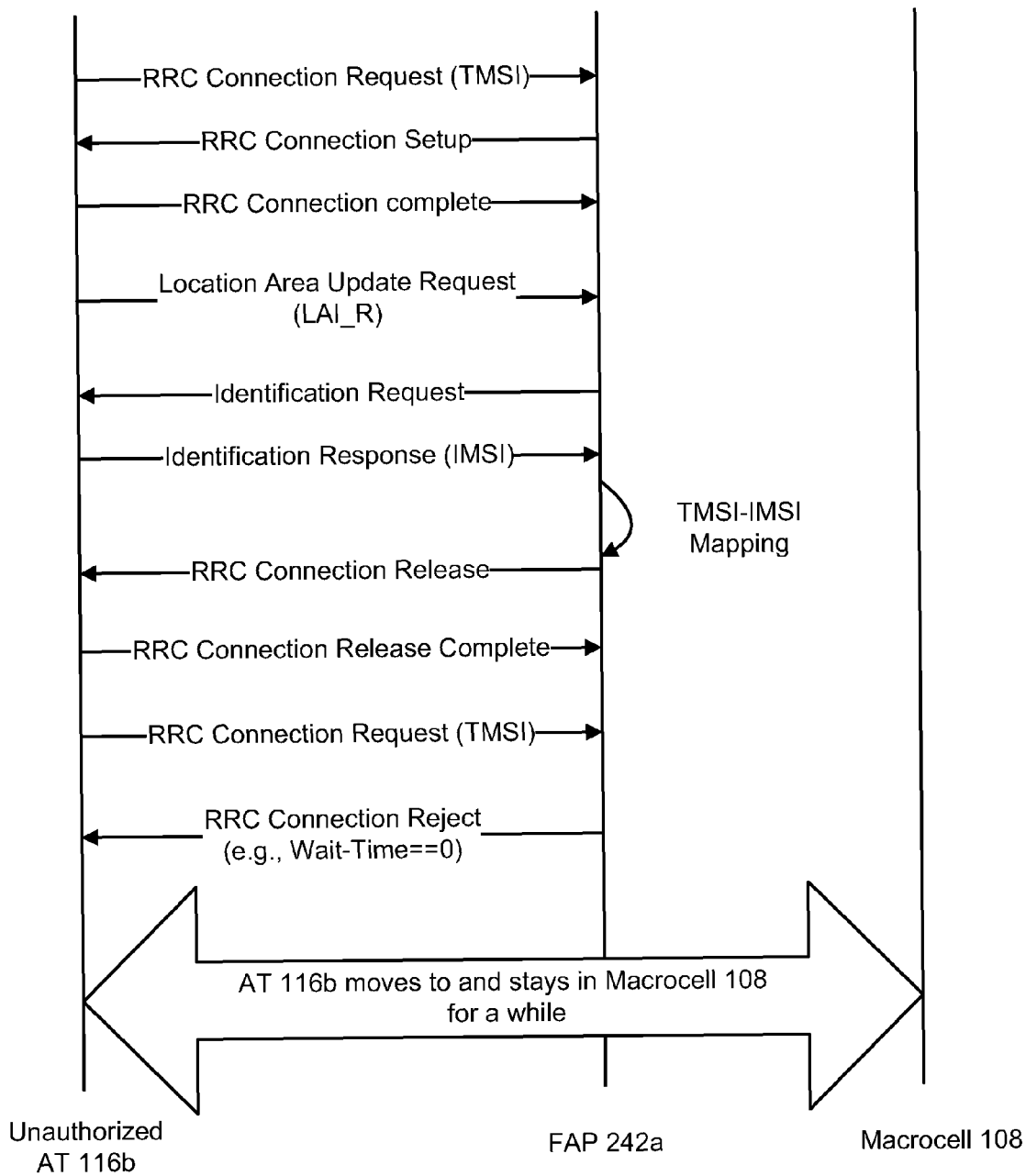

FIG. 11 is a diagram illustrating message traffic and activity between an unauthorized AT (e.g., AT 116b of FIGS. 2 and 6) and a FAP (e.g., FAP 242a), including an example implementation of a FAP 242a removal window handling procedure for the unauthorized AT (see (722) in FIG. 7). The procedure is performed while the FAP 242a is broadcasting the reserved LAI, LAI_R.

In similar fashion to that described above with respect to FIG. 8, an unauthorized AT 116b may perform system selection on the macrocell 108 and may ultimately hear the LAI being broadcast by the FAP 242a. Here, the FAP 242a is within the removal window broadcast interval and is broadcasting LAI_R (see FIG. 7 at (702), 714)). As described above, LAI_R is a reserved LAI that is effectively guaranteed by design not to be included on (or placed on) the forbidden list of any AT. Thus, unauthorized ATs will generally respond to the broadcast of LAI_R by the FAP 242a. The unauthorized AT 116b initiates a Location Area Update procedure with the FAP 242a, and an RRC Connection is setup and completed ("RRC Connection complete") between the AT 116b and the FAP 242a, as described above. The unauthorized AT 116b next sends a Location Area Update Request message using LAI_R to the FAP 242a. The FAP 242a, e.g., then obtains the AT's 116b IMSI and compares the IMSI with the FAP's 242a access control list, confirms that the AT 116b is not authorized, and builds up the FAP's 242a IMSI-TMSI mapping for that AT 116b for future use.

When the FAP 242a confirms that the AT 116b is not authorized, the FAP 242a terminates the RRC Connection by using, e.g., an RRC Release message and associated procedure ("RRC Connection Release", "RRC Connection Release Complete" in FIG. 11) without returning any Location Area Update response message to the unauthorized AT 116b. The FAP 242a does not send a Location Area Update Reject message using LAI_R with a reject cause code of permanent effect to the unauthorized AT 116b because doing so would place the LAI_R on the AT's 116b forbidden list, an act that is neither consistent with, nor permitted by, the definition of the reserved LAI, LAI_R. In an implementation, the reserved LAI can never be placed on any AT's forbidden list; thus, LAI_R is never placed in a Location Area Update Reject message from a FAP. In an implementation, the reserved LAI may only be included in a Location Area Update Accept message from a FAP.

Terminating the RRC Connection may generally not provide the unauthorized AT 116b with, e.g., a reject reason code, so the Location Area Update procedure is incomplete, the AT 116b may not be satisfied and may generally send another RRC Connection Request to the FAP 242a.

The FAP 242a rejects the unauthorized AT 116b and, e.g., redirects the AT 116b to the macrocell access point 108 (FAP 242a is in the service area 102 of macrocell 108). The unauthorized AT 116b may be redirected by the FAP 242a or may perform system selection with the macrocell 108 at the request of the FAP 242a. Generally, the AT 116b will move to and camp on the macrocell 108 for a period of time. One way in which the FAP 242a may reject and (indirectly) redirect the unauthorized AT 116b to the macrocell 108 is by sending an RRC Reject message "RRC Connection Reject" with a message parameter "Wait-time" set to 0. This RRC Reject message is explained in more detail in, e.g., 3GPP Technical Specification 25.331, sections 10.2.36 and 10.3.3.50. This message instructs the unauthorized AT 116b that no retry is allowed in the FAP 242a and that the AT 116b should promptly select any other suitable access point such as the macrocell 108. The FAP 242a may use other ways to reject and redirect the unauthorized AT 116b, such as (1) sending a RRC Connection Reject message with a message parameter "Redirect Info" set to a macrocell with overlapping coverage to that of the FAP 242a (macrocell 108) during a "RRC Connection Setup" stage following, e.g., the unauthorized AT's 116b second RRC Connection Request; or (2) sending a Location Area Update Reject message with any reject cause code of temporary-effect, such as "network failure" or "protocol error, unspecified", during the Location Area Update stage of communications with the unauthorized AT 116b. Other techniques that effectively result in redirection of an AT from the FAP to a macrocell with overlapping coverage to that of the FAP may be used.

As described above, each of the FAPs 242a-c shown in FIG. 2 is generally configured to continuously transmit or broadcast a main pilot signal. In some implementations, the FAPs 242a-c may also be configured to transmit a second pilot signal concurrently with the main pilot. This second pilot signal is designated the "greeting pilot" ("GP"). In FAP deployments that include greeting pilots, each single FAP may be referred to as including a "femtocell access point service cell" ("FAP service cell"; or "FAP SC") and a coupled "femtocell access point greeting pilot" ("FAP GP").

250b are configured to communicate with the core network 122 (via, e.g., femtocell server 244, see FIG. 2) and, e.g., set up registrations of ATs with the core network 122, and, e.g., provide services such as telephone call service to an AT. On the other hand, the FAP GPs 248a, 248b may generally be configured to facilitate a Location Area Update message exchange with an AT but are generally not configured to communicate with the core network 122 or to provide any FAP services to an AT beyond closed access control related functions.

Figure 12:
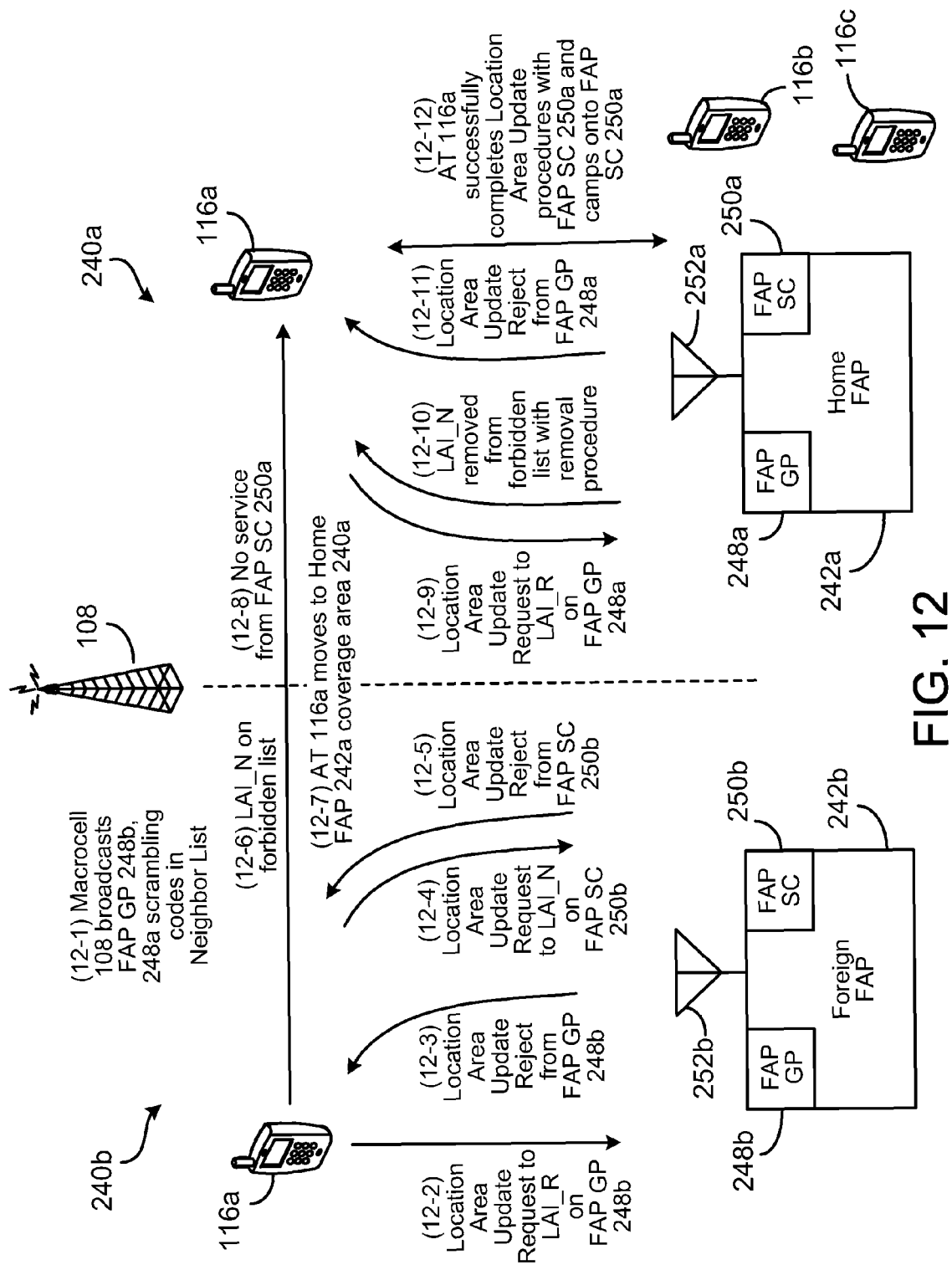
FIG. 12 is a diagram illustrating a portion of the femtocell deployment of FIG. 2.

Referring to FIG. 12, the FAP 242a uses the FAP GP 248a to perform closed access control functions such as an example forbidden list removal procedure to cause an authorized and blocked AT (such as AT 116a for part of FIG. 12) to remove a normal LAI (LAI_N) from its forbidden list. The FAP GP 248 also facilitates system selection by the AT 116a of the FAP 242a from the macrocell 108 as described below.

In an implementation, a macrocell and a FAP that includes a FAP Service Cell and a FAP Greeting Pilot are configured according to the following Table:

|  | Macrocell | FAP Greeting Pilot | FAP Service Cell |
|---|---|---|---|
| Location Area Identifier (LAI) | LAI_M | Reserved LAI: LAI_R | Normal LAI: LAI_N |
| Scrambling Code | Sc_M | Sc_F1 | Sc_F2 |
| Cell Ranking | Cell_Ranking_M | Cell_Ranking_F1; FAP Greeting Pilot should have higher cell ranking than Macrocell | Cell_Ranking_F2 FAP Service Cell should have higher cell ranking than FAP Greeting Pilot |
| Neighbor List Entry | FAP Greeting Pilot: Sc_F1 | FAP Service Cell: Sc_F2 | Macrocell: Sc_M |

FIG. 12 is a diagram illustrating the AT 116a that ultimately moves (12-7) from the coverage area 240b of the foreign FAP 242b to the coverage area 240a of the home FAP 242c. FIG. 6 shows the macrocell access point 108 and FAPs 242a, 242b in the service area of the macrocell 108. The respective coverage areas 240a, 240b of the FAPs 242a, 242b lie within the service area of the macrocell 108.

The home FAP 242a (e.g., from the perspective of the AT 116a, which is authorized on the FAP 242a) includes a FAP Greeting Pilot ("FAP GP; GP") 248a and a FAP Service Cell ("FAP SC") 250a. The foreign FAP 242b (e.g., from the perspective of the AT 116a, which is not authorized on the FAP 242b) includes a FAP GP 248b and a FAP SC 250b. For the FAPs 242a, 242b, the FAP GPs 248a, 248b may be thought of as greeting pilot signals respectively broadcast by the FAPs 242a, 242b on respective antennas 252a, 252b, and/or, e.g., more general greeting pilot capabilit(ies) or functionalit(ies) respectively included on the FAPs 242a, 242b. Thus, e.g., the FAP 242a may broadcast the FAP GP 248a, and/or may include the FAP GP 248a. For the FAPs 242a, 242b, the FAP SCs 250a, 250b may be thought of as main pilot signals respectively broadcast by the FAPs 242a, 242b, and/or, e.g., more general greeting pilot capabilit(ies) or functionalit(ies) respectively included on the FAPs 242a, 242b. Thus, e.g., the FAP GP 248a and the FAP SC 250a may perform actions such as communicating with or exchanging messages with an AT such as Location Area Update messages, and/or may itself represent an additional broadcast channel that may carry or include information or messages such as such as neighbor list information or Location Area Update messages. In an implementation, the FAP SCs 250a, Taking the macrocell 108 and the FAPs 242a, 242b of FIG. 12 as examples, the macrocell 108 broadcasts a macro LAI, LAI_M. The FAP SC 250a is always assigned a normal LAI, LAI_N, for broadcast, while the FAP GP 248a is assigned a reserved LAI, LAI_R, for broadcast. As described above with respect to, e.g., FIG. 6, LAI_R is a reserved LAI that is effectively guaranteed by design not to be included on (or placed on) the forbidden list of any AT. In the example shown in FIG. 12, the FAP SC 250b of the FAP 242b is assigned a normal LAI for broadcast that is identical to that of the FAP SC 250a, although in general the normal LAIs between FAPs very often differ, as described above. The FAP GP 248b is assigned a reserved LAI that is identical to that of the FAP GP 248a. Depending on how LAIs are assigned in a FAP deployment, it may be far more common for a FAP GP's reserved LAI to be the same as another FAP GP's reserved LAI, than for two FAP SC's to share the same normal LAI.

A "neighbor list" broadcast by an access point includes scrambling codes assigned to macrocells and femtocells that are neighbors of that access point. The neighbor list provided an AT that hears the list with a set of access points that the AT should search when determining whether the AT wants to camp on a different access point, or whether the AT wants to handoff an existing phone call to a different access point. The scrambling codes are used in WCDMA to separate transmissions from different access points sharing the same channel frequencies. In spread spectrum communications systems, scrambling codes are broadcast by access points and used by ATs to decode the signals broadcast by access points and to encode signals to be sent to access points. Referring to FIG. 12 and the Table above, the macrocell 108 has a scrambling code Sc_M, the FAP GP 248a has a scrambling code Sc_F1, and the FAP SC 250a has a scrambling code Sc_F2a. For FAP 242b, the FAP GP 248b has the same scrambling code Sc_F1 as the FAP GP 248a, although all FAPs need not share the same FAP GP scrambling code (greeting scrambling code). The FAP SC 250b on FAP 242b has a scrambling code Sc_F2b, which is different from the scrambling code Sc_F2a of the FAP SC 250a.

Each of the macrocell 108, the FAP GPs 248a, 248b, and the FAP SCs 250a, 250b broadcasts its own neighbor list of scrambling codes. In an implementation, a macrocell includes one or more scrambling codes for FAP greeting pilots in the macrocell's neighbor list; whereas scrambling codes for FAP service cells are not included in the macrocell's neighbor list. In implementations in which FAPs do not include FAP greeting pilots, the scrambling codes for the FAP service cells (in that case the FAP itself) would be included in the macrocell's neighbor list.

A FAP greeting pilot of a particular FAP may include a scrambling code for that FAP's FAP service cell in the FAP greeting pilot's neighbor list. A FAP service cell of a particular FAP may include a scrambling code for the macrocell in that FAP service cell's neighbor list. For a given macrocell and a FAP that includes a FAP greeting pilot and a FAP service cell, the FAP greeting pilot may be assigned a higher cell ranking than the macrocell, and the FAP service cell may be assigned a higher cell ranking than the FAP greeting pilot. Thus, referring to FIG. 12, the macrocell 108 includes the scrambling code Sc_F1 for the FAP GPs 248a, 248b in the macrocell's neighbor list. The FAP GPs 248a, 248b are both assigned higher cell rankings than the cell ranking Cell_ Ranking_M of the macrocell 108 (Cell_Ranking_F1>Cell_Ranking_M; see Table). Of course, the FAP GPs may have different scrambling codes as well as different cell rankings. The FAP GP 248a of the FAP 242a includes the scrambling code Sc_F2a of the FAP SC 250a in the FAP GP's 248a neighbor list. The FAP SC 248b of the FAP 242b includes the scrambling code Sc_F2b of the FAP SC 250b in the FAP GP's 248b neighbor list. The FAP SCs 250a, 250b are assigned cell rankings Cell_Ranking_F2, and this cell ranking is greater than the cell ranking Cell_Ranking_F1 shared by the FAP GPs 248a, 248b (Cell_Ranking_F2>Cell_Ranking_F1). Of course, the FAP SCs may have different cell rankings. The FAP SC 250a, 250b each include the scrambling code Sc_M of the macrocell 108 in their respective neighbor lists.

An AT may perform, e.g., "Stored Information Cell Selection" or "Initial Cell Selection", both of which are described in detail at 3GPP Technical Specification 25.304 section 5.2.3. An AT may rank candidate access points with which the AT may communicate (excluding those access points with LAIs on the AT's forbidden list). The AT may rank candidate access points or cells according to one or more parameters such as Hierarchical Cell Structure (HCS) priority settings, offsets, and/or a received a Primary Common Pilot Channel (P-CPICH) power level. Other parameters and techniques may be used to rank cells. Cell rankings, including HCS priorities, are described in more detail in, e.g., 3GPP Technical Specification 25.304, section 5.2.6.1.4.

In general, an AT hears the broadcast of a macrocell's neighbor list (including the scrambling code of a FAP greeting pilot) and may eventually be guided toward selecting the FAP greeting pilot when the AT comes within range of the FAP since the FAP greeting pilot has been assigned a higher cell ranking than that of the macrocell itself. Eventually, an AT hears the broadcast of the FAP greeting pilot's neighbor list (including the scrambling code of a FAP service cell coupled to the FAP greeting pilot) and may eventually be guided toward selecting the FAP service cell since the FAP service cell has been assigned a higher cell ranking than that of the FAP greeting pilot itself Eventually, an AT hears the broadcast of the FAP service cell's neighbor list (including the scrambling code of the macrocell) and may eventually select, be directed to select, or be redirected to, that macrocell by the FAP service cell and/or by the AT leaving the range of the FAP service cell.

FIG. 12 illustrates a general case of a FAP greeting pilot broadcasting a reserved LAI (LAI_R) to try to reestablish communication with any authorized AT that has the normal LAI (LAI_N) (broadcast by a FAP service cell coupled to the FAP greeting pilot) on its forbidden list. A forbidden list removal procedure is used by the FAP greeting pilot to remove the normal LAI (LAI_N) from an authorized AT's forbidden list. In FIG. 6, the macrocell 108 broadcasts (12-1) a FAP GP (248a, 248b) scrambling code (here "Sc_F1") in the macrocell's 108 neighbor list. The AT 116a is initially camping on the macrocell 108 and hears the neighbor list from the macrocell 108. At this point, the AT 116a does not have LAI_N on its forbidden list. LAI_N, for purposes of the example shown in FIG. 12, is the normal LAI broadcast by the FAP SC 250b and the FAP SC 250a. In other examples, FAP SCs of different FAPs more often than not do not have the same LAI. The FAP GP 248b scrambling code ("Sc_F1") has a higher cell ranking than the scrambling code ("SC_M") of the macrocell 108, so the AT 116a is guided toward selecting a FAP GP. The FAP GP 248b of the foreign FAP 242b broadcasts the reserved LAI (LAI_R) that is not on the forbidden list of any AT. The AT 116a moves into the coverage area 240b of the FAP 242b, hears the broadcast of the LAI_R. The unauthorized AT 116a sends (12-2) a Location Area Update Request message using LAI_R to the FAP GP 248b. The FAP GP 248b determines (using the FAP's 242b access control list) that the AT 116a is not authorized on the FAP 242b and sends (12-3) a Location Area Update Reject message with reject cause codes (e.g., UMTS cause codes #48 or #111, explained in more detail below). The FAP GP 248b broadcasts a FAP SC 250b scrambling code (here "Sc_F2b") in the FAP GP's 248b neighbor list. The FAP SC 250b scrambling code ("Sc_F2b") has a higher cell ranking than the scrambling code ("Sc_F1") of the FAP GP 248b, so the rejected AT 116a is guided toward selecting the FAP SC 250b.

The FAP SC 250b of the foreign FAP 242b broadcasts the normal LAI (LAI_N), and the unauthorized AT 116a hears the broadcast of the LAI_N. Since the AT 116a does not currently have LAI_N on its forbidden list, the unauthorized AT 116a sends (12-4) a Location Area Update Request message using LAI_N to FAP SC 250b. The FAP SC 250b determines (using the FAP's 242b access control list) that the AT 116a is not authorized on the FAP 242b and sends (12-5) a Location Area Update Reject message to the AT 116a with a reject cause code of permanent effect, i.e., a cause code that will put (12-6) LAI_N on the forbidden list 118a (see FIG. 2) of AT 116a. Later, when the AT 116a moves (12-7) into the coverage area 240a of the home FAP 242a, then because LAI_N (which is broadcast by the FAP SC 250a) is on the forbidden list of the AT 116a, the AT 116a will not attempt to camp onto the FAP SC 250a and will receive no normal (e.g., non-emergency) service (12-8) from the FAP SC 250a.

Assume that the AT 116a has been camping on the macrocell 108 prior to moving into the coverage area 240a of the home FAP 242a and thus hears the neighbor list from the macrocell 108. The FAP GP 248a scrambling code ("Sc_F1") has a higher cell ranking than the scrambling code ("SC_M") of the macrocell 108, so the AT 116a is guided toward selecting a FAP GP. The FAP GP 248*a* of the home FAP 242*a* broadcasts the reserved LAI (LAI_R) that is not on the forbidden list of any AT (in this example, the same LAI_R as broadcast by the FAP GP 248*b*). The AT 116*a* moves (12-7) into the coverage area 240*a* of the FAP 242*a*, and hears the broadcast of the LAI_R by the FAP GP 248*a*. The authorized AT 116*a* sends (12-9) a Location Area Update Request message using LAI_R to the FAP GP 248*a*. The FAP SG 248*a* determines (using the FAP's 242*a* access control list) that the AT 116*a* authorized on the FAP 242*a* and will then perform (12-10) the forbidden list removal procedure, after which LAI_N will no longer be on the forbidden list of the AT 116*a*. The forbidden list removal and unblocking of the authorized AT is accomplished by returning a Location Area Update Accept message using the LAI_N to the authorized AT, here AT 116*a*, in response to the Location Area Update Request message from the AT 116*a* that included LAI_R. This forbidden list removal and unblocking is described in more detail below. The description of the use of the Location Area Update Accept message in removing a forbidden list entry may be found in 3GPP Technical Specification 24.008, section 4.4.4.6. The unblocked AT 116*a* sends another Location Area Update Request message using LAI_R to the FAP 242*a*, and, even though the AT 116*a* is authorized on the home FAP 242*a*, the FAP GP 248*a* sends (12-11) a Location Area Update Reject message with reject cause codes (e.g., UMTS cause codes #48 or #111, explained in more detail below). The FAP GP 248*a* broadcasts a FAP SC 250*a* scrambling code (here "Sc_F2a") in the FAP GP's 248*a* neighbor list. The FAP SC 250*a* scrambling code ("Sc_F2a") has a higher cell ranking than the scrambling code ("Sc_F1") of the FAP GP 248*a*, so the rejected AT 116*a* is guided toward selecting the FAP SC 250*a*.

The FAP SC 250*a* of the home FAP 242*a* broadcasts the normal LAI (LAI_N), and the authorized AT 116*a* hears the broadcast of the LAI_N. After the forbidden list removal procedure, the AT 116*a* does not have LAI_N on its forbidden list, so the authorized AT 116*a* sends a Location Area Update Request message using LAI_N to FAP SC 250*a*. The FAP SC 250*a* determines (using the FAP's 242*a* access control list) that the AT 116*a* is authorized on the FAP 242*a* and sends a Location Area Update Accept message using LAI_N to the AT 116*a*. Thus, the AT 116*a* successfully completes (12-12) Location Area Update procedures with the FAP SC 250*a* and camps onto the FAP SC 250*a*.

Figure 13:
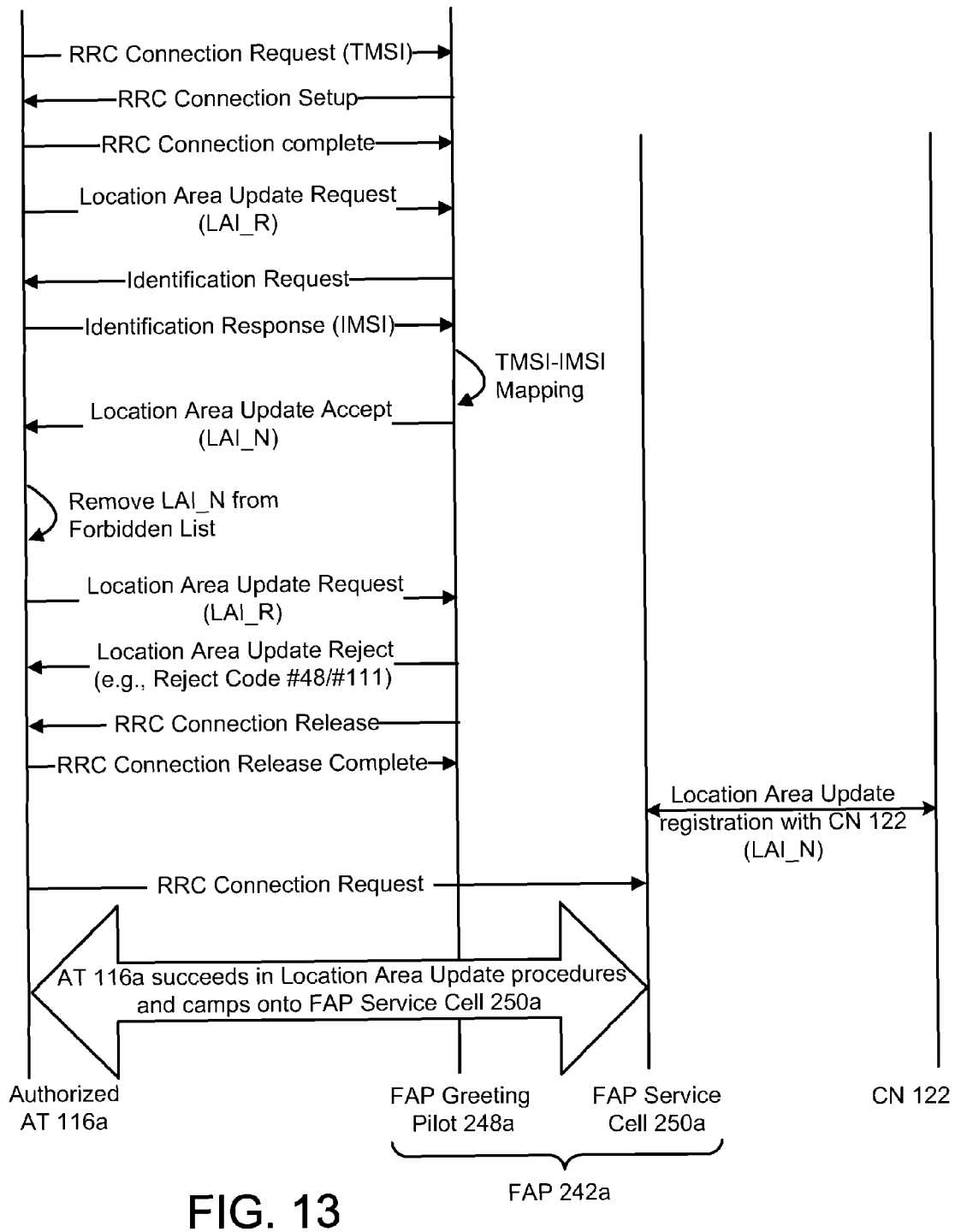
FIGS. 13 and 14 are diagrams illustrating message traffic and activity between access terminals and femtocells.

FIG. 13 is a diagram illustrating message traffic and activity between an authorized AT (e.g., AT 116*a*) and a FAP (e.g., FAP 242*a*) that includes a FAP greeting pilot 248*a*.

Assume the authorized AT 116*a* is camped on the macrocell access point 108. The AT 116*a* may perform system selection on the macrocell 108 by listening to a neighbor list being broadcast by the macrocell 108. The macrocell 108 neighbor list includes the Scrambling Code of the FAP GP 248*a* (and/or one or more several generic greeting scrambling codes for femtocells). The FAP GP 248*a* scrambling code ("Sc_F1") has a higher cell ranking than the scrambling code ("SC_M") of the macrocell 108, so the AT 116*a* is guided toward selecting the FAP GP 248*a*. The FAP GP 248*a* of the FAP 242*a* broadcasts the reserved LAI (LAI_R). As described above, LAI_R is a reserved LAI that is effectively guaranteed by design not to be included on (or placed on) the forbidden list of any AT. Thus, even an authorized AT that has the FAP SC's 250*a* normal LAI on the AT's forbidden list will generally respond to the broadcast of LAI_R by the FAP GP 248*a*. When the authorized AT 116*a* is listening for the FAP GP 248*a* and is within the coverage area 240*a* of the FAP 242*a*, the authorized AT 116*a* hears the LAI_R being broadcast by the FAP GP 248*a*. Since the FAP GP's 248*a* LAI_R is different from the LAI (LAI_M) of the macrocell 108, the authorized AT 116*a* is triggered to initiate a Location Area Update procedure with the FAP GP 248*a*. In order to do the Location Area Update procedure, the authorized AT 116*a* initiates an RRC connection by sending a RRC Connection Request with the AT's 116*a* TMSI AT identifier to the FAP GP 248*a*. The FAP GP 248*a* continues RRC Connection Setup with the AT 116*a* and the RRC connection is complete ("RRC Connection complete").

The authorized AT 116*a* next sends a Location Area Update Request message using LAI_R to the FAP GP 248*a*. The FAP GP 248*a*, e.g., then obtains the AT's 116*a* IMSI and compares the IMSI with the FAP's 242*a* access control list (see ACL 246*a* in FIG. 2), confirms that the AT 116*a* is authorized, and builds up the FAP GP's 248*a* IMSI-TMSI mapping for that AT 116*a* for future use.

When the FAP GP 248*a* confirms that the AT 116*a* is authorized, then, instead of responding to the AT 116*a* with Location Area Update Accept message that uses LAI_R, which the FAP GP 248*a* is broadcasting, the FAP GP 248*a* returns a Location Area Update Accept message using LAI_N, the normal LAI that the coupled FAP SC 250*a* of the FAP 242*a* is broadcasting. The FAP GP 248*a* does this in order to perform an example forbidden list removal procedure and clear the FAP SC's 250*a* normal LAI from the forbidden list of the authorized AT 116*a*. The description of the use of the Location Area Update Accept message in removing a forbidden list entry may be found in 3GPP Technical Specification 24.008, section 4.4.4.6: "If the LAI or PLMN identity contained in the LOCATION UPDATING ACCEPT message is a member of the list of 'forbidden location areas for regional provision of service', the list of 'forbidden location areas for roaming' or the 'forbidden PLMN list' then such entries shall be deleted."

Thus, the FAP GP 248*a* responds to a Location Area Update Request message using LAI_R (received from the AT 116*a*) by sending a Location Area Update Accept message using LAI_N to the AT 116*a*. An authorized but blocked AT is triggered to remove LAI_N from the AT's forbidden list. An authorized and unblocked AT does not have LAI_N on its forbidden list, so the AT has no specific action to perform in response to the Location Area Update Accept message from the FAP GP 248*a*. Thus, the FAP GP 248*a* procedure for authorized ATs does not differentiate between blocked and unblocked ATs. Thus, in some implementations, the FAP GP 248*a* (and the FAP 242*a*) may employ closed access control techniques without knowledge of whether a particular authorized AT is blocked (e.g., has the FAP SC's 250*a* normal LAI in its forbidden list) or is unblocked.

Upon receipt of the Location Area Update Accept message with LAI_N from the FAP GP 248*a*, the authorized (now unblocked, or still unblocked) AT 116*a* detects that normal LAI (LAI_N) is different from the reserved LAI (LAI_R) being currently broadcast by the FAP GP 248*a*. The FAP GP's 248*a* response to the AT's 116*a* earlier Location Area Update Request message with LAI_R does not satisfy the AT 116*a*, so the AT 116*a* sends another Location Area Update Request message using LAI_R to the FAP GP 248*a*.

This time, the FAP 242*a* returns a Location Area Update Accept message with the reserved LAI (LAI_R) enclosed to the authorized AT 116*a*. Rather than sending a Location Area Update Accept message with LAI_R after unblocking the authorized AT 116*a*, the FAP GP 248*a* sends a Location Area Update Reject message with reject cause codes (e.g., UMTS cause codes #48 or #111) and terminates the RRC Connection by using, e.g., an RRC Release message and associated procedure ("RRC Connection Release", "RRC Connection Release Complete" in FIG. 13). For UMTS reject cause code #111, see 3GPP Technical Specification 24.008 section 4.4.4.9; 3GPP Technical Specification 25.304 section 5.2.2.4. For UMTS reject cause code #48, see 3GPP Technical Specification 24.008 sections 4.4.4.9 and 4.2.2.2. Either cause code, #48 or #111, will reject the authorized AT 116a and effectively redirect the AT 116a to the FAP SC 250a. Other cause codes or commands that effectively redirect that AT 116a to the FAP SC 250a may be used.

Depending on the particular AT that receives the UMTS cause code #48 or #111 in a Location Area Update Reject message, the AT will either enter an "Attempting to Update" substate, see, e.g., 3GPP Technical Specification 24.008 section 4.2.2.2 for more information; or, instead, enter a "PLMN SEARCH" Substate, see, e.g., 3GPP Technical Specification 24.008 section 4.2.1.2; 3GPP Technical Specification 23.122 section 4.4.3 for more information.

If the authorized AT 116a enters the "Attempting to Update" substate, the AT 116a is effectively directed to attempt to camp on an access point. The AT 116a may perform "Any Cell Selection", which is described in detail at 3GPP Technical Specification 24.008 section 5.2.2.4. Generally, the AT 116a may use the FAP GP's 248a neighbor list to get information on access points for the AT to try and camp on. The FAP GP 248a broadcasts a FAP SC 250a scrambling code (here "Sc_F2a") in the FAP GP's 248a neighbor list. The FAP SC 250a scrambling code ("Sc_F2a") has a higher cell ranking than the scrambling code ("Sc_F1") of the FAP GP 248a, so the rejected AT 116a is guided toward selecting the FAP SC 250a. In this substate, it may be advantageous for the scrambling code of the FAP SC 250a to be on the FAP GP's neighbor list; otherwise, the AT 116a may not be able to find the FAP SC 250a.

If the authorized AT 116a enters the "PLMN SEARCH" substate, the AT 116a does not consult the FAP GP's 248a neighbor list. The AT 116a may perform "Stored Information Cell Selection" or "Initial Cell Selection", both of which are described in detail at 3GPP Technical Specification 25.304 section 5.2.3. If the AT 116a performs "Stored Information Cell Selection, the AT 116a may promptly select the FAP SC 250a. If the AT 116a performs "Initial Cell selection", the AT 116a may begin a search for any access point, including those not on the neighbor list. Eventually, the AT 116a finds the FAP SC 250a and attempts to camp on the FAP SC 250a.

Whichever substate is entered by the authorized AT, the AT 116a eventually hears the FAP SC 250a of the home FAP 242a broadcasting the normal LAI (LAI_N). After the forbidden list removal procedure performed by the FAP GP 248a, the AT 116a does not have LAI_N on its forbidden list, so the authorized AT 116a sends a Location Area Update Request message using LAI_N to FAP SC 250a. The FAP SC 250a determines (using the FAP's 242a access control list) that the AT 116a is authorized on the FAP 242a and sends a Location Area Update Accept message using LAI_N to the AT 116a. Thus, the AT 116a successfully completes Location Area Update procedures with the FAP SC 250a and camps onto the FAP SC 250a.

As described above, in a femtocell deployment, a FAP may generally be configured to perform the Location Area Update procedure with the AT and, for those ATs that are authorized on the FAP, the FAP may exchange certain messages (e.g., Location Area Update messages) with the core network to register the AT with the core network so that from the perspective of the core network it may be as if the core network is communicating with the AT directly. In an implementation, the FAP may regenerate Location Area Update messages, or replay ones that the FAP 242a previously received, and send the messages to the core network to register the AT. Thus, referring to FIG. 13, the FAP SC 250a of the FAP 242a performs Location Area Update registration of the AT 116a with the core network 122.

In FIG. 10, an authorized AT 116 registered with the core network 122 by the FAP 242a carried on communications with the FAP 242a using the FAP's reserved LAI (LAI_R), not its normal LAI (LAI_N), so that, in order to register the AT 116 on and interface with the core network 122, the FAP 242a would shield its reserved LAI (LAI_R) from the core network 122 and the FAP 242a would translate LAIs between the normal LAI (LAI_N) and the reserved LAI (LAI_R) in communications with the core network 122. From the perspective of the core network 122, the authorized AT 116a would be seen as located in LAI_N, not LAI_R, even though the AT 116a was communicating with the FAP 242a using LAI_R, not LAI_N. In contrast with FIG. 10, in FIG. 13 (and FIG. 12), the FAP 242a broadcasts a greeting pilot, FAP GP 248a, which avoids the need for translation in messaging from the LAI_N to the LAI_R and vice versa. After rejection and effective redirection from the FAP GP 248a to the FAP SC 250a, the authorized AT 116a is camping on and/or using the FAP SC 250a using the LAI_N, so the FAP SC 250a performs no LAI translation in communications with the core network 122.

Figure 14:
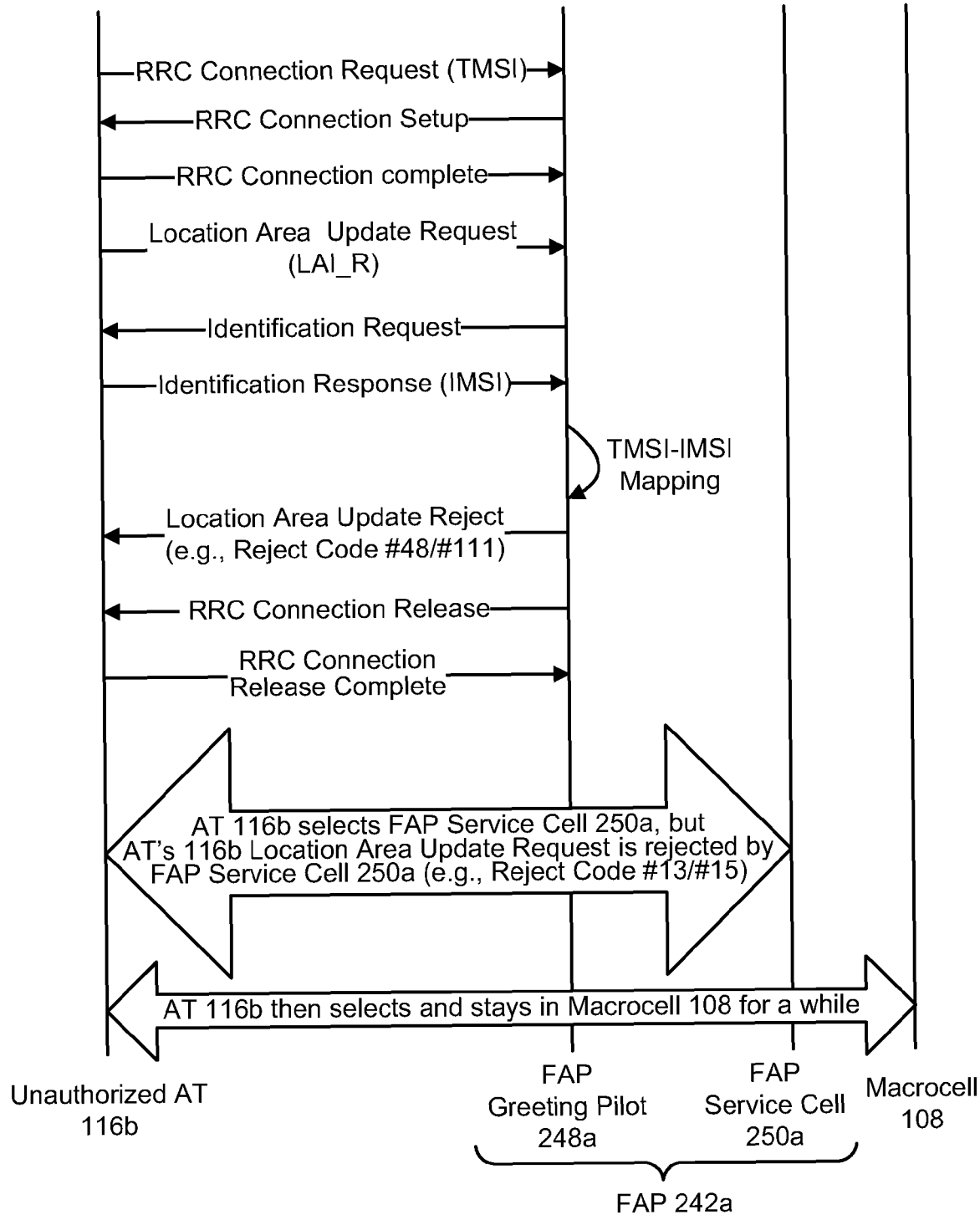

FIG. 14 is a diagram illustrating message traffic and activity between an unauthorized AT (e.g., AT 116a) and a FAP (e.g., FAP 242a) that includes a FAP greeting pilot 248a.

In similar fashion to that described above with respect to FIG. 13, an unauthorized AT 116b (see FIG. 13, AT 116b is unauthorized on FAP 242a so that FAP 242a is a foreign FAP to AT 116a) may perform system selection on the macrocell 108, and, due in part to a higher cell ranking being assigned to the scrambling code of the FAP GP 242a than the scrambling code of the macrocell 108, the AT 116a may ultimately hear the reserved LAI_R being broadcast by the FAP GP 248a. As described above, LAI_R is a reserved LAI that is effectively guaranteed by design not to be included on (or place on) the forbidden list of any AT. Thus, unauthorized ATs will generally respond to the broadcast of LAI_R by the FAP GP 248a. The unauthorized AT 116b initiates a Location Area Update procedure with the FAP GP 248a, and an RRC Connection is setup and completed ("RRC Connection complete") between the AT 116a and the FAP GP 248a, as described above. The unauthorized AT 116b next sends a Location Area Update Request message using LAI_R to the FAP GP 248a. The FAP GP 248a, e.g., then obtains the AT's 116b IMSI and compares the IMSI with the FAP's 242a access control list, confirms that the AT 116b is not authorized, and builds up the FAP GP's 248a IMSI-TMSI mapping for the AT 116b for future use.

When the FAP GP 248a confirms that the AT 116b is not authorized, the FAP GP 248a does not send a Location Area Update Reject message using LAI_R with a reject cause code of permanent effect to the unauthorized AT 116b because doing so would place the LAI_R on the AT's 116b forbidden list, an act that is neither consistent with, nor permitted by, the definition of the reserved LAI, LAI_R. In an implementation, the reserved LAI can never be placed on any AT's forbidden list; thus, LAI_R is never placed in a Location Area Update Reject message from a FAP. In an implementation, the reserved LAI may only be included in a Location Area Update Accept message from a FAP.

The FAP GP 248a instead sends a Location Area Update Reject message with reject cause codes (e.g., UMTS cause codes #48 or #111) and terminates the RRC Connection by using, e.g., an RRC Release message and associated procedure ("RRC Connection Release", "RRC Connection Release Complete" in FIG. 14). For UMTS reject cause code #111, see 3GPP Technical Specification 24.008 section 4.4.4.9 and Technical Specification 25.304 section 5.2.2.4. For UMTS reject cause code #48, see 3GPP Technical Specification 24.008 sections 4.4.4.9 and 4.2.2.2. Either cause code, #48 or #111, will reject the unauthorized AT 116b and effectively redirect the AT 116b to the FAP SC 250a. Other cause codes or commands that effectively redirect that AT 116b to the FAP SC 250a may be used.

Depending on the particular AT that receives the UMTS cause code #48 or #111 in a Location Area Update Reject message, the AT will either enter an "Attempting to Update" substate, see 3GPP Technical Specification 24.008 section 4.2.2.2 for more information; or, instead, enter a "PLMN SEARCH" Substate, see 3GPP Technical Specification 24.008 section 4.2.1.2; 3GPP Technical Specification 23.122 section 4.4.3, for more information. These substates are explained in more detail above with respect to FIG. 13.

Whichever substate is entered by the authorized AT, the AT 116b eventually hears the FAP SC 250a of the foreign FAP 242a broadcasting the normal LAI (LAI_N). If the unauthorized AT 116b does not already have LAI_N on its forbidden list from a prior rejection at another FAP, then the unauthorized AT 116b sends a Location Area Update Request message using LAI_N to FAP SC 250a. The FAP SC 250a determines (using the FAP's 242a access control list) that the AT 116a is not authorized on the FAP 242a and the FAP SC 250a rejects the unauthorized AT 116b. The FAP SC 250a may return a Location Area Update Reject message using the FAP SC's 250a normal LAI (LAI_N) with a reject cause code of permanent effect to the unauthorized AT 116b. A reject cause code of permanent effect sent to an AT places the LAI enclosed in the Location Area Update Reject message in the forbidden list of the AT. Here, the FAP SC's 250a LAI_N is placed on the forbidden list of the unauthorized AT 116b. Examples of reject cause codes of permanent effect include the UMTS codes #13 ("Roaming not allowed in this location area") and #15 ("No Suitable Cells in Location Area"). See, e.g., 3GPP Technical Specification 24.008, section 4.4.4.7 for more detail. Both codes #13 and #15 cause the LAI to be stored in an AT's forbidden list. Other codes or commands that place a LAI (or multiple LAIs) in an AT's forbidden list may be used.

Using a reject cause code that places a FAP's normal LAI on an unauthorized AT's forbidden list avoids (at least until the entry for the normal LAI in the forbidden list or the entire forbidden list is cleared) a situation in which the unauthorized AT gets rejected but continues to try to camp on the FAP (a foreign FAP from the unauthorized AT's perspective) whenever the AT hears the FAP broadcast its normal LAI.

The RRC Connection between the FAP SC 250a and the unauthorized AT 116b is released. Upon receiving the Location Area Update Reject message with LAI_N from the FAP SC 250a, the unauthorized AT 116b adds the FAP SC's 250a normal LAI (LAI_N) to the AT's 116b forbidden list. While LAI_N is on the forbidden list, the unauthorized AT 116b will not attempt to reach the FAP SC 250a when the FAP SC 250a is broadcasting its normal LAI (LAI_N). The unauthorized AT automatically tries system selection with the macrocell access point 108, and may generally re-select and camp onto the macrocell 108 (FAP 242a is in the service area 102 of macrocell 108). Due to cell ranking in the macrocell 108 neighbor list, the unauthorized AT 116b may eventually return to the FAP GP 248a to face rejection once again.

Note that if an unauthorized AT 116b tries to camp on the FAP SC 250a directly without first going to the FAP GP 248a, the FAP SC 250a will reject the AT 116 in similar fashion to that described above.

Signals broadcast by FAPs may cause interference for overlapping macrocell access point(s). A FAP that broadcasts a greeting pilot signal concurrently with a main pilot signal will produce more power (and thus cause more interference) than a FAP that does not broadcast the greeting pilot signal, or that turns off the greeting pilot signal from time to time.

Whenever the FAP greeting pilot (FAP GP) is turned on and broadcasting the LAI_R, the FAP GP may attract ATs—both authorized and unauthorized ATs. The FAP GP may effectively send authorized ATs to the FAP service cell (FAP SC), but may only reject unauthorized ATs for a time. An unauthorized ATs may generally return to attempt to camp on the FAP GP, which may drain the batteries of the unauthorized AT.

Figure 15:
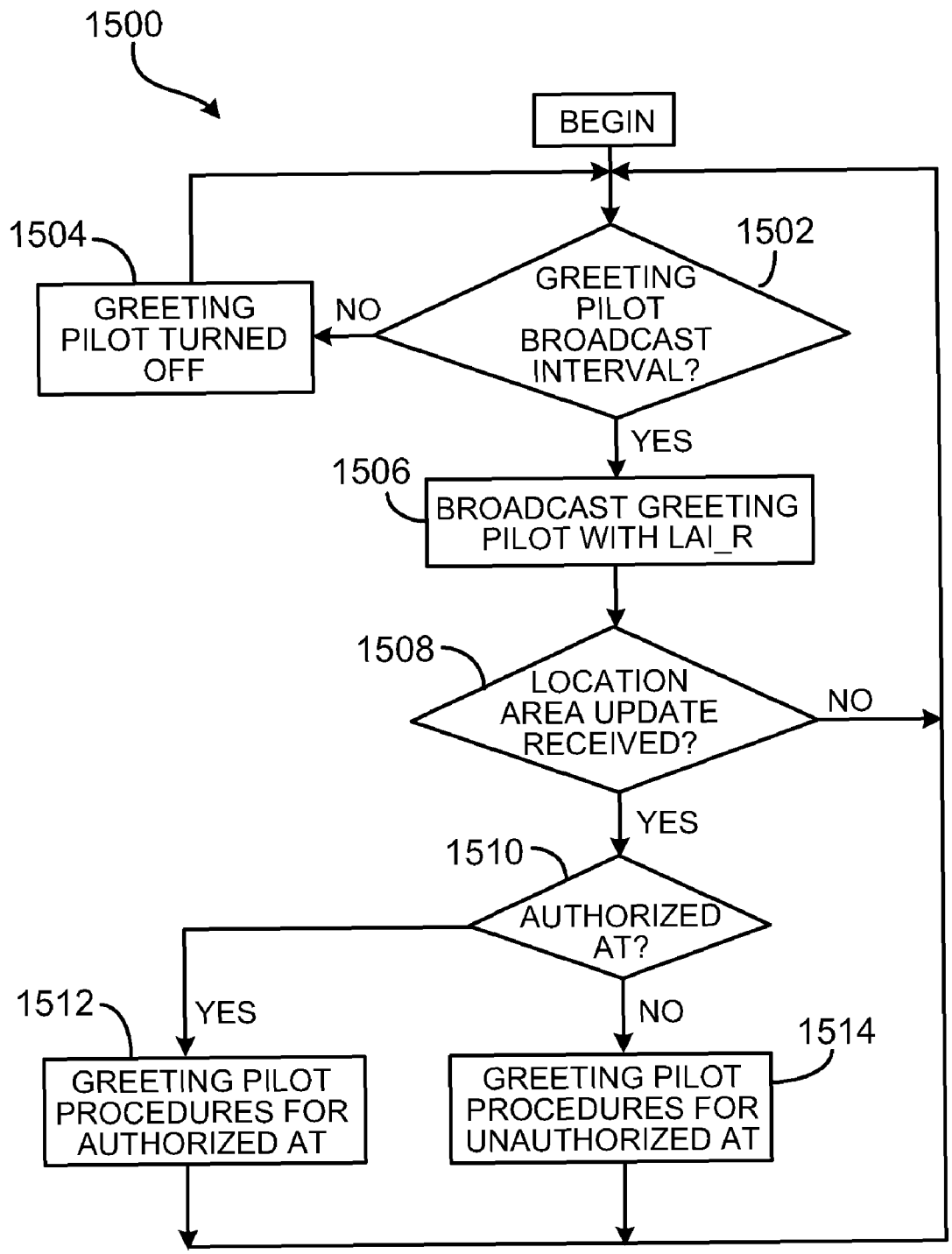
FIG. 15 is a flow diagram of another example process for closed access control.

FIG. 15 illustrates an example process 1500 for closed access control that may be implemented on the FAP 242a (and the FAP 242b) shown in FIG. 12. According to the process 1500, the FAP GP is sometimes turned on and broadcasting the LAI_R, and at other times the FAP GP is turned off. In an implementation, when all authorized ATs for a particular FAP have camped on the FAP, the FAP may turn off the FAP GP and thus stop broadcasting the reserved LAI_R and may instead just continue to broadcast the LAI_N with the FAP SC until, e.g., such time as fewer than all authorized ATs are camped on the FAP. The timing of turning on the FAP GP and broadcasting a reserved LAI may be periodically or randomly triggered, or event triggered. For example, the FAP may be configured to turn on the FAP GP and broadcast the reserved LAI for S seconds every T minutes. S and T may be constant (for the case of turning the FAP GP on and off on a periodic basis) or may each randomly vary (for the case of randomly switching the FAP GP on and off). S may be on the order of, e.g., 10 seconds, while T may be on the order of, e.g., 5 minutes. In an example of random switching of the FAP GP, the FAP GP may be turned on and broadcasting the LAI_R for 11 seconds, then the FAP GP may be turned off for 5 minutes, then the FAP GP may be turned on and broadcasting the LAI_R for 10 seconds, then the FAP GP may be turned off for 4.7 minutes, and so on. An example of an event triggered on-off switching of the FAP GP might include the FAP querying a forbidden list model database such as the second database 404 of FIG. 4 or the database 502 of FIG. 5.

As in the case of a FAP that alternates in broadcasting a normal LAI (LAI_N) and a reserved LAI (LAI_R), a design trade-off may present itself when deciding how long to keep the FAP greeting pilot (which broadcasts the reserved LAI, LAI_R) turned on. When the FAP GP is turned on and broadcasting the reserved LAI, then since the reserved LAI is on no AT's forbidden list, any nearby unauthorized ATs can try to camp on the FAP. Likewise, as mentioned above, the FAP GP increases the broadcast power of the FAP and thus increases the interference that the FAP may cause to a macrocell access point with overlapping coverage to that of the FAP. For reasons such as there, it may be advantageous in some implementations to broadcast the reserved LAI for as short a time as possible, and thus to minimize the duration that the FAP GP is turned on. On the other hand, the longer that the FAP GP is turned off and the only LAI broadcast by the FAP is the normal LAI broadcast by the FAP service cell, the longer that, e.g., a home user using an authorized but blocked AT may have to wait before being able to use the user's home FAP.

Thus, it may be helpful not to leave the FAP GP turned off for too long a period. Designers may trade off one competing concern for the other.

The duration of the FAP GP being turned on and broadcasting the reserved LAI (S seconds in duration) may be referred to as a greeting pilot broadcast interval. In the example process 1500 of FIG. 15, the FAP 242a of FIG. 12 determines (1502) whether the FAP 242a is presently operating in the greeting pilot broadcast interval. The FAP 242a may check a timer to see if the FAP 242a is within the window. If the FAP 242a is within the window, the FAP 242a turns on the FAP GP 248a and the FAP GP 248a broadcasts (1506) the reserved LAI, LAI_R. Otherwise, the FAP GP 248a is turned off (1504). If the FAP GP 248a is turned on, then if a Location Area Update Request message is received (1508), then the FAP GP 248a determines (1510) whether the AT is authorized on the FAP 242a. Processing of the Location Area Update Request message by the FAP GP 248a depends on whether or not the AT that sent the Location Area Update Request message is authorized to camp on and use the FAP 242a. If the AT is an authorized AT (e.g., AT 116a), the FAP 242a and its FAP GP 248a execute (1512) greeting pilot procedures for an authorized AT. An example of this procedure is shown as part of FIG. 13. If the AT is an unauthorized T (e.g., AT 116b of FIGS. 2 and 12), the FAP 242a and its FAP GP 248a execute (1514) greeting pilot procedures for an unauthorized AT. An example of this procedure is shown as part of FIG. 14.

The FAP may gather information to assist in the FAP minimizing the greeting pilot broadcast interval, e.g., the duration of the FAP GP being turned on and broadcasting the reserved LAI (S seconds in duration). For example, one of the pieces of information provided by a macrocell access point to an AT that is camping on the macrocell is how long the AT should perform cell re-selection from the macrocell. That is, how long the AT must hear a signal from another access point (such as a FAP) before the AT should try to camp on that other access point. An AT may be told by the macrocell that the AT should listen to a competing access point signal for, e.g., a continuous 100 milliseconds (or some other comparable value such as 50 milliseconds, other values may be used) before the AT should try to camp on the access point that is broadcasting the competing signal. This information is broadcast by the macrocell as DRX (discontinuous receive) cycle parameters in the system information block. DRX cycle parameters are explained in more detail in, e.g., 3GPP Technical Specification 25.133, sections 4.2.2.6 and 4.2.2.7 (see, e.g., Table 4.1); 3GPP Technical Specification 25.331, section 10.3.3.49. In an implementation, the FAP may attempt to obtain this DRX cycle parameter information (or similar information) from a macrocell with overlapping coverage to that of the FAP. Upon receiving the (e.g.,) DRX cycle parameter information, the FAP may use the information to set a greeting pilot broadcast interval for the FAP GP (e.g., the duration that the FAP GP is turned on) so that, e.g., the AT is more likely to hear the FAP GP.

The FAP may obtain the macrocell DRX cycle parameter information by listening to the broadcasts that the macrocell sends to ATs that are camping on the macrocell. A FAP typically is configured to gather information from a macrocell, for example when the FAP is turned on. In order to hear the macrocell signals and thus obtain the desired information, the FAP generally must turn its own transmitter off, otherwise all the FAP's receiver will hear is its own broadcast signals. The FAP may turn its transmitter off and listen to the macrocell periodically or randomly and/or according to some schedule, but the FAP may do so at times of typically low service demands on the FAP, e.g., the FAP may listen to macrocell every day at 3 A.M., or the like.

In an implementation, the core network 122 or some other RAN 100 entity may periodically or randomly provide this information to the FAP.

In similar fashion, referring once again to FIG. 6, a FAP such as FAP 242a may gather information to assist in the FAP minimizing the removal window broadcast interval, e.g., the duration of the reserved LAI being broadcast (X seconds in duration). Similarly, the FAP may utilize macrocell DRX cycle parameter information to select a duration for the removal window broadcast interval.

Although the techniques described above employ the UMTS air interface standard, the techniques are also applicable to other CDMA and non-CDMA air interface technologies in which, e.g., messages can be passed between access terminals and other network components.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more machine-readable storage media or in a propagated signal, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such actions can be omitted to achieve the same, or similar, results to those described herein.

Components of different implementations may be combined to form implementations not specifically set forth above. Other implementations not specifically described are also within the scope of the following claims.

What is claimed is:

1. A method, comprising:
   broadcasting a first access point identifier from a private access point in a radio access network, the first access point identifier comprising a first location area identifier and the second access point identifier comprises a second location area identifier;
   broadcasting a second access point identifier from the private access point;
   receiving a first message from a first access terminal that is authorized on the private access point, the first message comprising the second access point identifier; and
   sending a second message to the first access terminal, the second message comprising the first access point identifier, and the second message being configured to cause the first access terminal to remove the first access point identifier from an access point identifier block list of the first access terminal if the first access point identifier is on the access point identifier block list of the first access terminal;
   wherein the access point identifier block list comprises a forbidden list.

2. The method of claim 1, wherein sending the second message comprises:
   sending a location area update accept message to the first access terminal, the location area update accept message comprising the first access point identifier, the first access point identifier comprising a first location area identifier; and
   wherein receiving the first message comprises:
   receiving a location area update request message from the first access terminal, the location area update request message comprising the second access point identifier, the second access point identifier comprising a second location area identifier.

3. The method of claim 1, wherein the private access point is configured so that the second access point identifier is never sent in any message from the private access point that would cause the second access point identifier to be placed on an access point identifier block list of any access terminal that is authorized on the private access point.

4. The method of claim 1, wherein the private access point is configured so that the second access point identifier is never sent in any reject message originating from the private access point.

5. The method of claim 1, further comprising:
   stopping broadcasting the second access point identifier when every access terminal that is authorized on the private access point is using the private access point.

6. The method of claim 1, wherein broadcasting the second access point identifier from the private access point comprises:
   broadcasting the second access point identifier at least one of periodically or randomly.

7. The method of claim 1, wherein when the second access point identifier is being broadcast from the private access point, the first access point identifier is not being broadcast from the private access point.

8. The method of claim 1, wherein broadcasting the first access point identifier from the private access point comprises:
   broadcasting the first access point identifier in a first pilot signal from the private access point; and
   for at least some of a time that the first access point identifier is broadcast, broadcasting the first access point identifier concurrently with broadcasting the second access point identifier; and
   wherein broadcasting the second access point identifier from the private access point comprises:
   broadcasting the second access point identifier in a second pilot signal from the private access point.

9. The method of claim 8, wherein the first pilot signal has a corresponding first scrambling code and the second pilot signal has a corresponding second scrambling code;
   the first scrambling code being different from the second scrambling code, the method further comprising:
   broadcasting a first neighbor list, the first neighbor list comprising a third scrambling code, the third scrambling code corresponding to a macrocell access point; and broadcasting a second neighbor list, the second neighbor list comprising the first scrambling code.

10. The method of claim 8, wherein broadcasting the second access point identifier in the second pilot signal comprises:
    broadcasting the second access point identifier in a greeting pilot signal from the private access point.

11. The method of claim 10, further comprising:
stopping broadcasting the greeting pilot signal when every access terminal that is authorized on the private access point is using the private access point.

12. The method of claim 1, further comprising:
receiving a third message from the first access terminal, the third message comprising the second access point identifier; and
sending a fourth message to the first access terminal, the fourth message comprising the second access point identifier.

13. The method of claim 12, further comprising:
translating the second access point identifier to the first access point identifier to facilitate communication between one or more other entities in the radio access network and the first access terminal via the private access point and so that the second access point identifier is not used in communication between the private access point and the one or more entities.

14. The method of claim 2, further comprising:
receiving a second location area update request message from the first access terminal, the second location area update request message comprising the second access point identifier, the second access point identifier comprising the second location area identifier; and
sending a second location area update accept message to the first access terminal, the second location area update accept message comprising the second access point identifier, the second access point identifier comprising the second location area identifier.

15. The method of claim 8, further comprising:
receiving a third message from the first access terminal, the third message comprising the second access point identifier;
sending a reject message to the first access terminal;
receiving a fourth message from the first access terminal in response to the first pilot signal, the fourth message comprising the first access point identifier; and
sending a fifth message to the first access terminal, the fifth message comprising the first access point identifier.

16. The method of claim 6, further comprising:
listening to information broadcast from a macrocell access point; and
determining an interval within which to broadcast the second access point identifier using a portion of the information.

17. The method of claim 16, wherein the portion of the information comprises discontinuous receive cycle length parameters.

18. A method, comprising:
broadcasting a first access point identifier from a private access point in a radio access network; and
broadcasting a second access point identifier from the private access point, the first access point identifier and the second access point identifier being configured to identify the private access point to access terminals in the radio access network, the second access point identifier being different from the first access point identifier, and individual ones of the access terminals being either authorized or unauthorized on the private access point;
wherein the first access point identifier comprises a first location area identifier and the second access point identifier comprises a second location area identifier.

19. The method of claim 18, further comprising:
determining whether an access terminal of the access terminals is authorized or unauthorized on the private access point by comparing an access terminal identifier of the access terminal to an access control list.

20. The method of claim 18, further comprising, prior to broadcasting the second access point identifier from the private access point:
receiving a first message from a first access terminal of the access terminals, the first message comprising the first access point identifier;
determining that the first access terminal is unauthorized on the private access point; and determining that the first access point identifier is the same as an access point identifier of an other private access point on which the first access terminal is authorized.

21. The method of claim 20, wherein receiving the first message comprises:
receiving a location area update request message from the first access terminal, the location area update request message comprising the first access point identifier, the first access point identifier comprising a first location area identifier.

22. The method of claim 20, wherein determining that the first access point identifier is the same as the access point identifier of the other private access point comprises at least one of accessing a database, or receiving an indication that the first access point identifier is the same as the access point identifier of the other private access point.

23. The method of claim 20, further comprising:
prior to broadcasting the second access point identifier, determining that the second access point identifier is not on an access point identifier block list of a second access terminal of the access terminals, the second access terminal being authorized on the private access point.

24. The method of claim 23, wherein the access point identifier block list comprises a forbidden list.

25. The method of claim 23, wherein determining that the second access point identifier is not on the access point identifier block list of the second access terminal comprises at least one of accessing a database, or receiving an indication that the second access point identifier is not on the access point identifier block list of the second access terminal.

26. The method of claim 18, further comprising, prior to broadcasting the second access point identifier from the private access point:
determining that the first access point identifier was at least recently on an access point identifier block list of a first access terminal of the access terminals, the first access terminal being authorized on the private access point.

27. The method of claim 26, wherein determining that the first access point identifier was at least recently on the access point identifier block list of the first access terminal comprises at least one of accessing a database, or receiving an indication that the first access point identifier was at least recently on the access point identifier block list of the first access terminal.

28. The method of claim 18, wherein the second access point identifier is configured to not be on an access point identifier block list of a first access terminal of the access terminals, the first access terminal being authorized on the private access point.

29. The method of claim 18, further comprising:
stopping broadcasting the second access point identifier when every access terminal that is authorized on the private access point is using the private access point.

30. The method of claim 18, wherein the second access point identifier is never included in a reject message sent from the private access point to any access terminal of the access terminals.

31. The method of claim 18, further comprising, prior to broadcasting the second access point identifier from the private access point:
    determining that the private access point is within a removal window broadcast interval.

32. The method of claim 31, wherein broadcasting the second access point identifier from the private access point further comprises:
    broadcasting the second access point identifier from the private access point in a greeting pilot signal; and
    wherein the removal window broadcast interval comprises a greeting pilot broadcast interval.

33. The method of claim 18, wherein broadcasting the second access point identifier from the private access point comprises:
    broadcasting the second access point identifier at least one of periodically or randomly.

34. The method of claim 18, wherein broadcasting the second access point identifier from the private access point comprises:
    broadcasting the second access point identifier from the private access point instead of the first access point identifier.

35. The method of claim 18, wherein broadcasting the first access point identifier from the private access point comprises:
    broadcasting the first access point identifier in a first pilot signal from the private access point; and
    for at least some of a time that the first access point identifier is broadcast, broadcasting the first access point identifier concurrently with broadcasting the second access point identifier; and wherein broadcasting the second access point identifier from the private access point comprises:
        broadcasting the second access point identifier in a second pilot signal from the private access point.

36. A method, comprising:
    assigning one or more reserved access point identifiers to a private access point network that comprises two or more private access points so that each private access point of the two or more private access points is assigned at least one reserved access point identifier of the one or more reserved access point identifiers, the one or more reserved access point identifiers comprising one or more reserved location area identifiers; and
    configuring the two or more private access points of the private access point network so that each reserved access point identifier of the one or more reserved access point identifiers is never sent in any message from the private access point network that would cause the reserved access point identifier to be placed on an access point identifier block list of any access terminal in range of one or more private access points of the private access point network;
    wherein the access point identifier block list comprises a forbidden list.

37. The method of claim 36, wherein assigning the one or more reserved access point identifiers to the private access point network comprises:
    assigning one reserved access point identifier to the private access point network so that each private access point of the two or more private access points is assigned the same one reserved access point identifier.

38. A method, comprising:
    broadcasting a first location area identifier from a private access point in a radio access network; and
    wherein the private access point never includes the first location area identifier in any reject message sent from the private access point to any access terminal that communicates with the private access point such that the first location area identifier is configured to at least not be on a forbidden list of any access terminal that is authorized on the private access point.

39. The method of claim 38, further comprising:
    broadcasting a second location area identifier from the private access point; and
        wherein broadcasting the first location area identifier from the private access point comprises:
            broadcasting the first location area identifier to attract to the private access point any access terminal that is authorized on the access terminal and that has the second location area identifier on the forbidden list of the access terminal.

40. A method, comprising:
    broadcasting a first access point identifier from a first private access point in a radio access network;
    receiving a first message from a first access terminal, the first message comprising the first access point identifier;
    determining whether the first access terminal is authorized or unauthorized on the first private access point;
    if the first access terminal is unauthorized, determining whether the first access point identifier is the same as an access point identifier of a second private access point on which the first access terminal is authorized; and
    if the first access point identifier is the same as the access point identifier of the second private access point, broadcasting a second access point identifier from the first private access point.

41. The method of claim 40, wherein the first access point identifier comprises a first location area identifier and the second access point identifier comprises a second location area identifier, and the access point identifier of the second private access point comprises a location area identifier of the second private access point.

42. The method of claim 40, further comprising:
    if the first access point identifier is the same as the access point identifier of the second private access point, selecting the second access point identifier for broadcast; and
    stopping broadcasting the first access point identifier when the second access point identifier is selected.

43. The method of claim 40, wherein determining whether the first access point identifier is the same as the access point identifier of the second private access point comprises at least one of accessing a database, or receiving an indication regarding whether the first access point identifier is the same as the access point identifier of the second private access point.

44. The method of claim 42, wherein selecting the second access point identifier for broadcast comprises:
    determining whether a potential second access point identifier is at least likely to be on any access point identifier block list of any access terminal that is authorized on the first private access point.

45. The method of claim 44, wherein determining whether the potential second access point identifier is likely to be on any access point identifier block list of any access terminal that is authorized on the first private access point comprises at least one of accessing a database, or receiving an indication regarding whether the potential second access point identifier is likely to be on any access point identifier block list of any access terminal that is authorized on the first private access point.

46. The method of claim 45, wherein accessing the database comprises:
   accessing the database, the database storing at least one of access point identifier block list models corresponding to access terminals, or information regarding the access point identifier block list models, wherein the access terminals comprise any access terminals that are authorized on the first private access point.

47. A method, comprising:
   broadcasting a first access point identifier from a first private access point in a radio access network;
   determining whether a first access point identifier was at least recently on an access point identifier block list of a first access terminal that is authorized on the first private access point;
   if the first access point identifier was at least recently on the access point identifier block list; broadcasting a second access point identifier from the first private access point.

48. The method of claim 47, wherein the first access point identifier comprises a first location area identifier and the second access point identifier comprises a second location area identifier; and
   wherein the access point identifier block list comprises a forbidden list.

49. The method of claim 47, wherein determining whether the first access point identifier was at least recently on the access point identifier block list of the first access terminal comprises at least one of accessing a database, or receiving an indication regarding whether the first access point identifier was at least recently on the access point identifier block list of the first access terminal.

50. The method of claim 49, wherein accessing the database comprises:
   accessing the database, the database storing at least one of access point identifier block list models corresponding to access terminals, or information regarding the access point identifier block list models, wherein the access terminals comprise the first access terminal and any other access terminals that are authorized on the first private access point.

51. The method of claim 47, further comprising:
   if the first access point identifier was at least recently on the access point identifier block list of the first access terminal, selecting the second access point identifier for broadcast; and stopping broadcasting the first access point identifier when the second access point identifier is selected.

52. The method of claim 51, wherein selecting the second access point identifier for broadcast comprises:
   determining whether a potential second access point identifier is at least likely to be on any access point identifier block list of any access terminal that is authorized on the first private access point.

53. The method of claim 52, wherein determining whether the potential second access point identifier is likely to be on any access point identifier block list of any access terminal that is authorized on the first private access point comprises at least one of accessing a database, or receiving an indication regarding whether the potential second access point identifier is likely to be on any access point identifier block list of any access terminal that is authorized on the first private access point.

54. The method of claim 53, wherein accessing the database comprises:
   accessing the database, the database storing at least one of access point identifier block list models corresponding to access terminals, or information regarding the access point identifier block list models, wherein the access terminals comprise any access terminals that are authorized on the first private access point.

55. A method, comprising:
   receiving a location area update request message from an access terminal, the location area update request message comprising a first location area identifier, the location area update request message being received at a private access point in a radio access network; and
   sending an location area update accept message from the private access point to the access terminal in response to the location area update request message, the location area update accept message comprising a second location area identifier.

* * * * *